Jan. 25, 1938.　　J. W. BRYCE　　2,106,477
ACCOUNTING MACHINE
Filed Aug. 26, 1932　　16 Sheets-Sheet 1

INVENTOR
James W. Bryce
BY
Cooper Kerr + Dunham
ATTORNEY

Jan. 25, 1938.        J. W. BRYCE        2,106,477
ACCOUNTING MACHINE
Filed Aug. 26, 1932        16 Sheets-Sheet 2

INVENTOR
James W. Bryce
BY Cooper, Kerr & Dunham
ATTORNEY

Jan. 25, 1938.   J. W. BRYCE   2,106,477
ACCOUNTING MACHINE
Filed Aug. 26, 1932   16 Sheets-Sheet 3
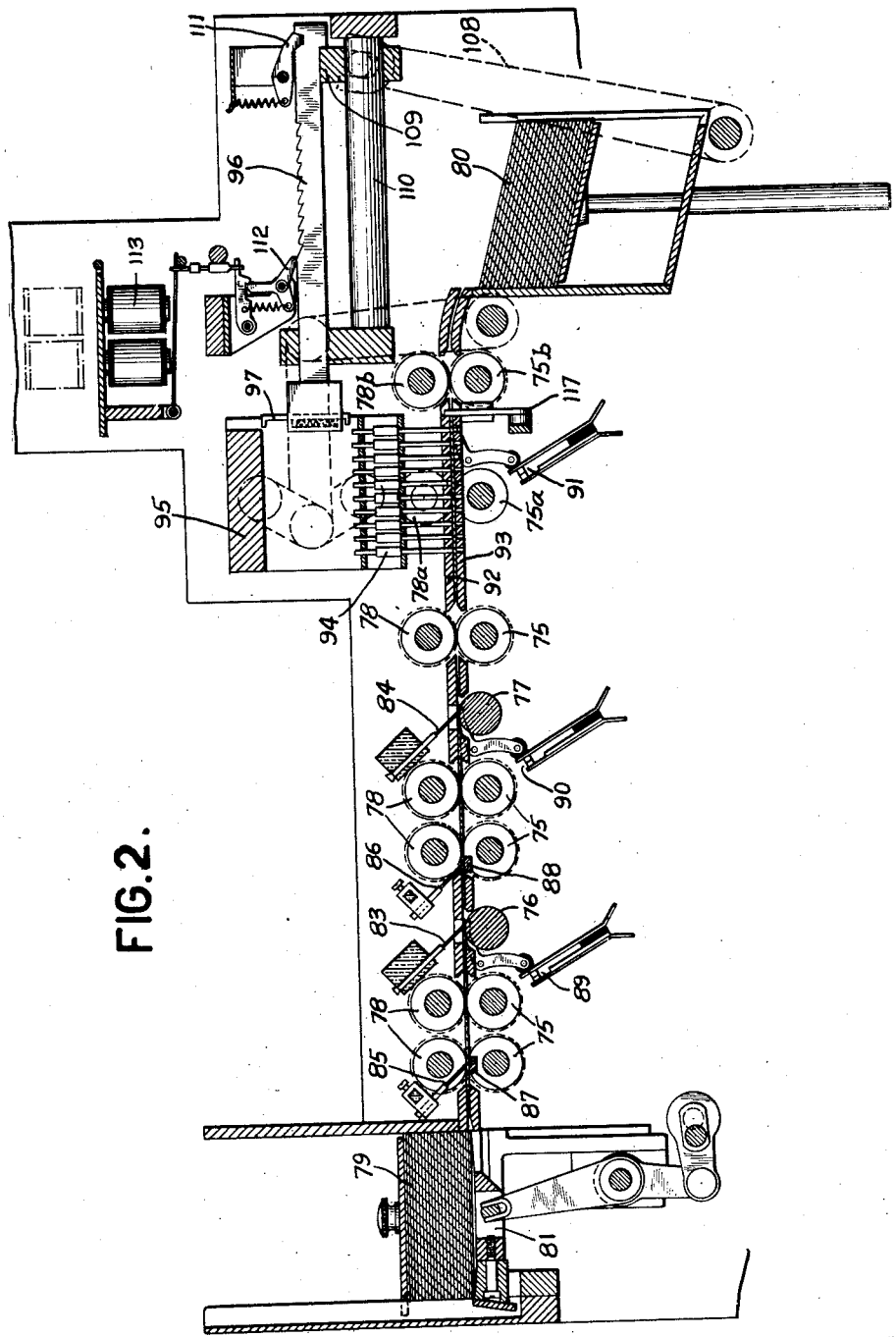
INVENTOR
James W. Bryce
BY
Cooper Kerr & Dunham
ATTORNEY

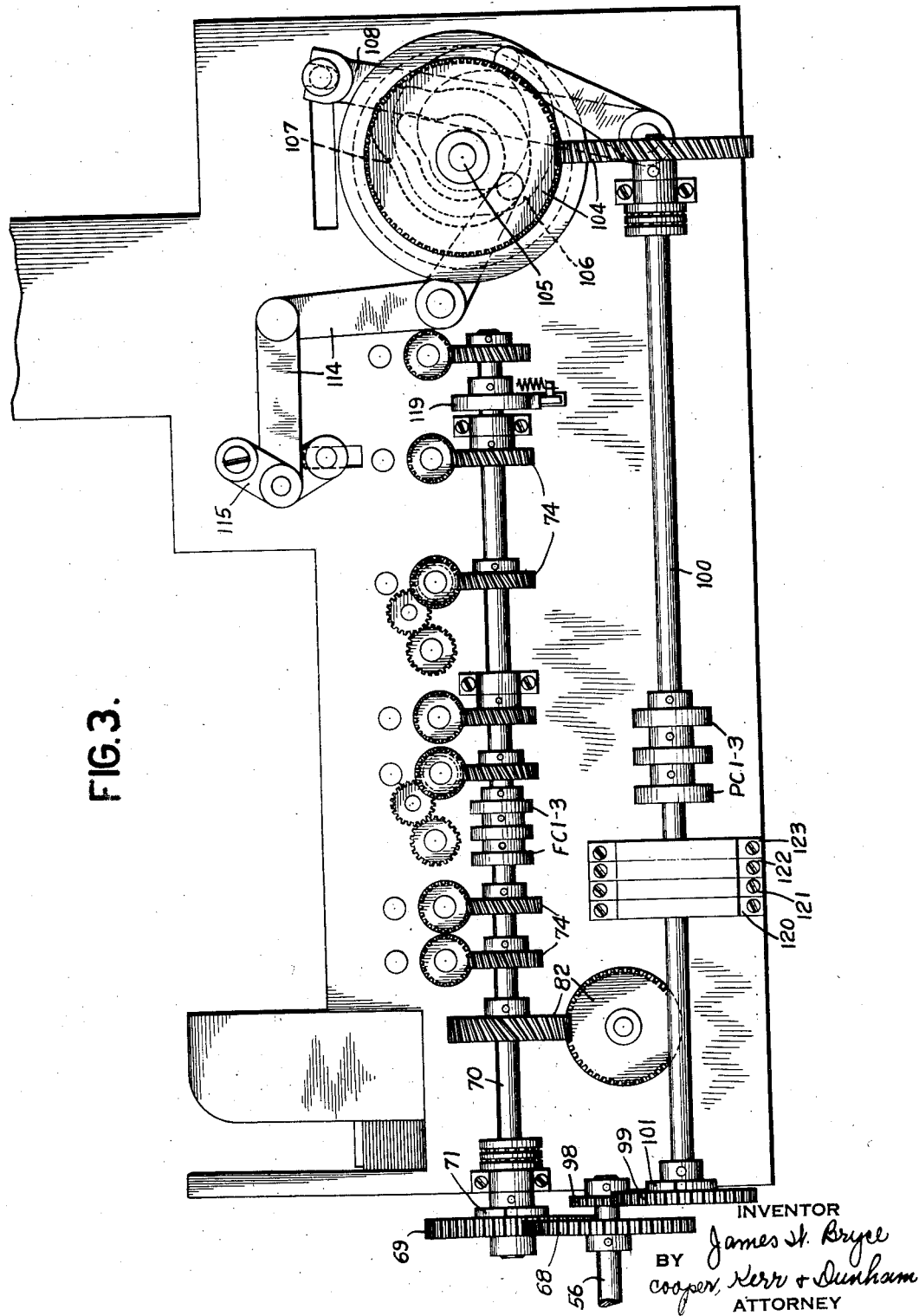

Jan. 25, 1938.         J. W. BRYCE         2,106,477
ACCOUNTING MACHINE
Filed Aug. 26, 1932         16 Sheets-Sheet 5

INVENTOR
James W. Bryce
BY Cooper, Kerr & Dunham
ATTORNEY

Jan. 25, 1938.   J. W. BRYCE   2,106,477
ACCOUNTING MACHINE
Filed Aug. 26, 1932   16 Sheets-Sheet 6
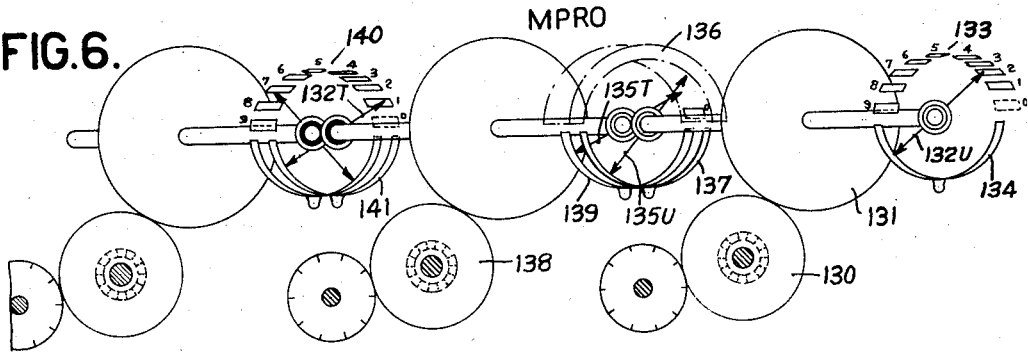
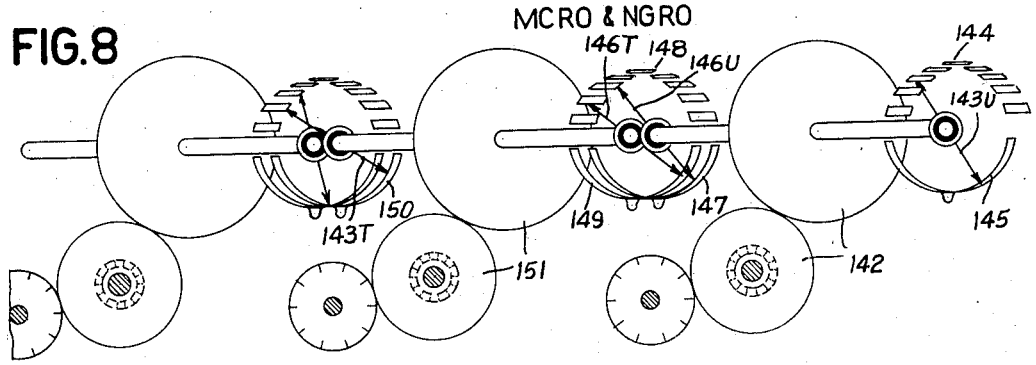
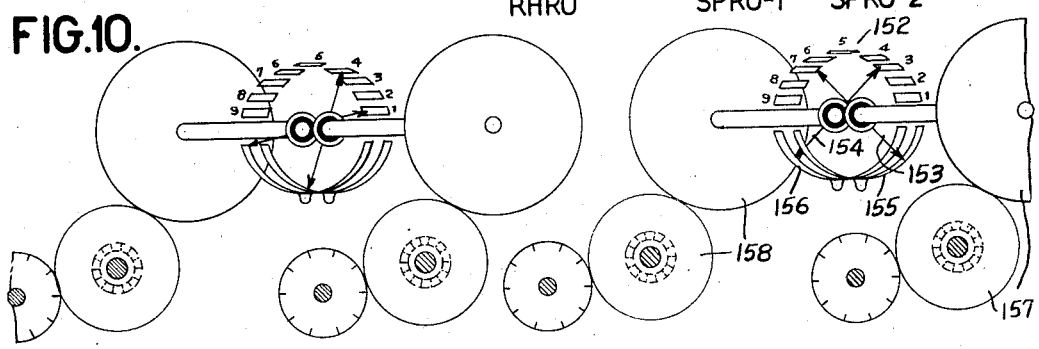
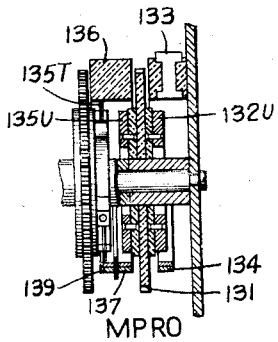
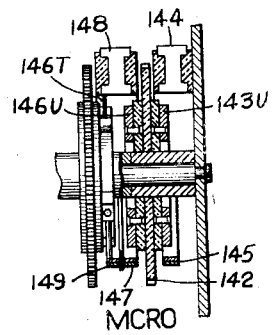
INVENTOR
James W. Bryce
BY
Cooper, Kerr & Dunham
ATTORNEY Jan. 25, 1938.　　　　J. W. BRYCE　　　　2,106,477
ACCOUNTING MACHINE
Filed Aug. 26, 1932　　16 Sheets-Sheet 7

INVENTOR
James W. Bryce
BY
Cooper Kerr & Dunham
ATTORNEY

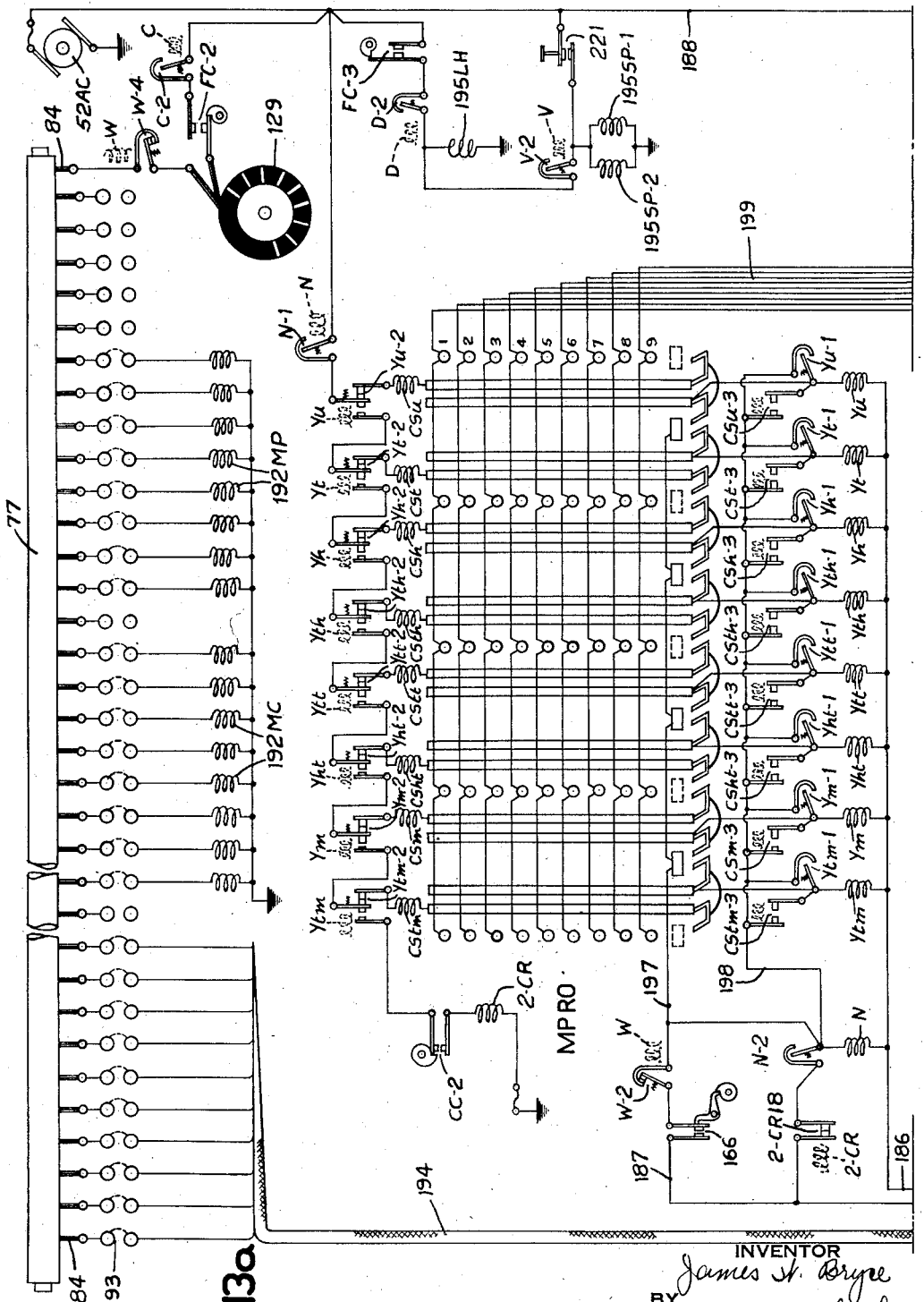

Jan. 25, 1938.  J. W. BRYCE  2,106,477
ACCOUNTING MACHINE
Filed Aug. 26, 1932  16 Sheets-Sheet 9

INVENTOR
James W. Bryce
BY Cooper Kerr + Dunham
ATTORNEY

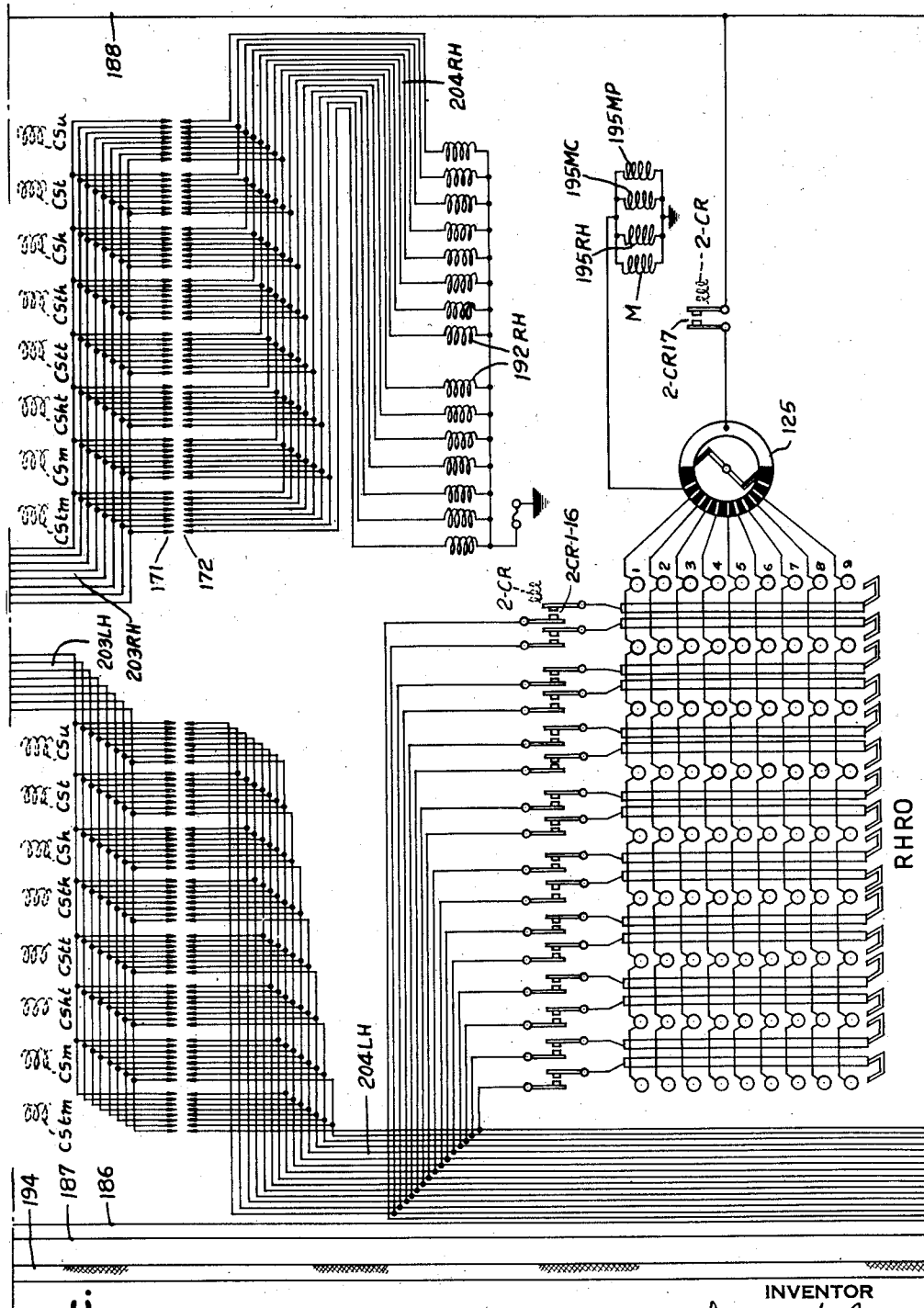

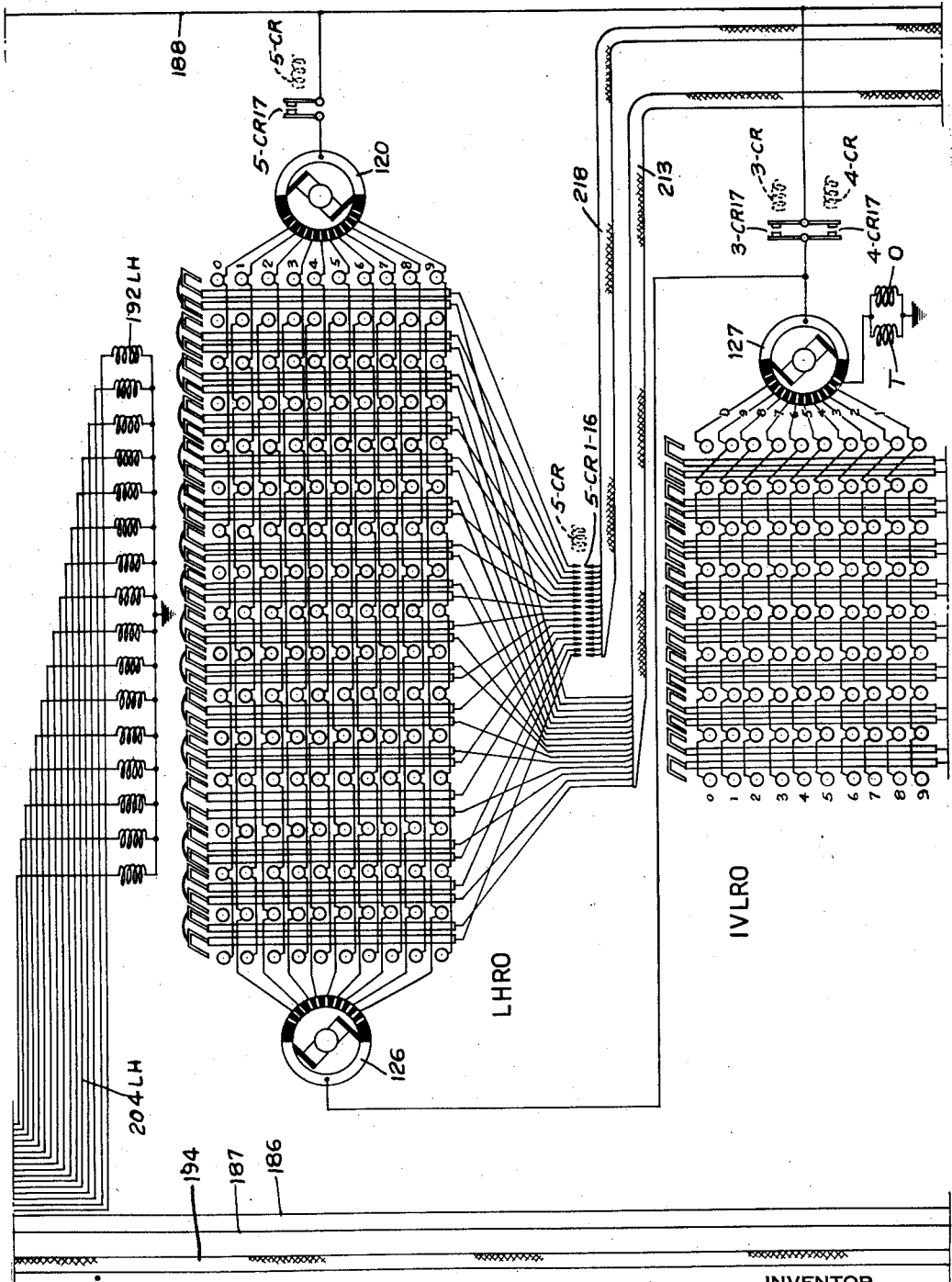

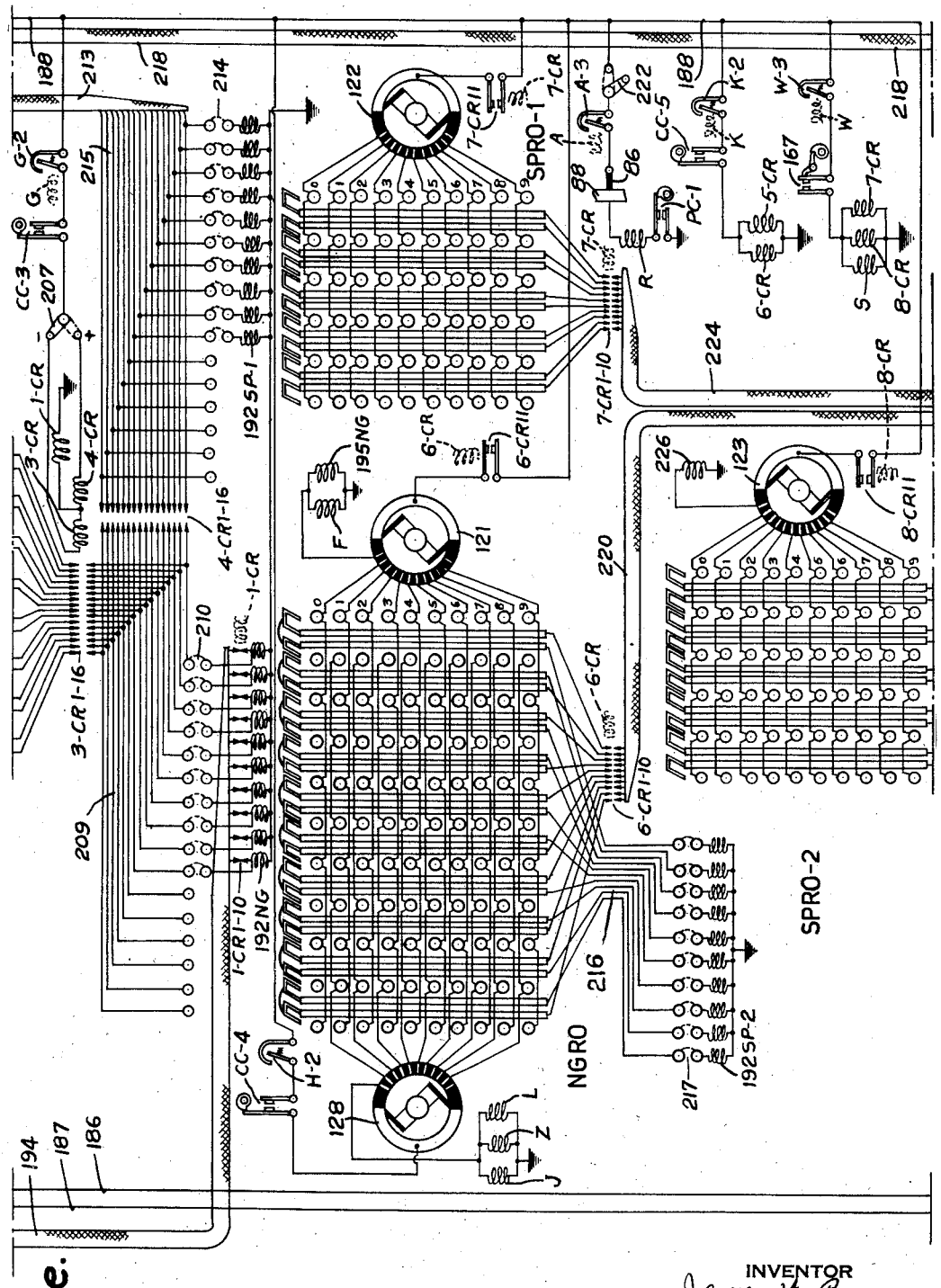

Jan. 25, 1938. J. W. BRYCE 2,106,477
ACCOUNTING MACHINE
Filed Aug. 26, 1932 16 Sheets-Sheet 13

INVENTOR
James W. Bryce
BY
Cooper, Kerr & Dunham
ATTORNEY

Jan. 25, 1938.                J. W. BRYCE                 2,106,477
                          ACCOUNTING MACHINE
                         Filed Aug. 26, 1932      16 Sheets-Sheet 14

Patented Jan. 25, 1938

2,106,477

UNITED STATES PATENT OFFICE 2,106,477

ACCOUNTING MACHINE

James W. Bryce, Bloomfield, N. J., assignor, by mesne assignments, to International Business Machines Corporation, New York, N. Y., a corporation of New York Application August 26, 1932, Serial No. 630,513

23 Claims. (Cl. 235—61.6)

This invention relates to improvements in accounting machines and more particularly to improvements in record controlled and record making accounting machines.

In previous machines devised by me, provision is made for carrying out computations of the general form $$(A \times B) \pm (C \times D) = \text{result or } A \pm (B \times C) = \text{result}.$$

In such previous machines the ultimate or final result was recorded upon the record from which the components or factors entering into the computation were derived. In certain cases, however, additional recorded information is desired. It is desired not only that a record be obtained of the entire result of the computation, but records are also desired of certain intermediate results which enter into and become a part of the final result. Thus with computations of the general form $A \pm (B \times C) = \text{result } R$, it is desired that there also be recorded the intermediate result of $R'$ obtained by multiplying $B \times C$ in addition to recording the final result of $R$.

According to the present invention, provision is made for obtaining a record of intermediate results of the $B \times C$ products obtained in computations of the general form $A - (B \times C) = \text{result}$ and $A + (B \times C) = \text{result}$. Provision is also made for recording the final result of R so that each record may emerge from the machine with recorded data thereon of both the final result of the computation and the intermediate result of a part of the computation which becomes added to or subtracted from another component entering into the computation by the operation of the machine. Such records can then be tabulated in any desired manner.

One use of a machine of this class would be for effecting computations wherein net profits and costs are to be computed. In such computations the A term or component of a problem would be the gross selling price of a number of units. The B term might represent the number of units sold and the C term the cost price per unit. The final result of the computation $A - (B \times C)$ would be the profit on the transaction and the intermediate result or $B \times C$ would be the cost of the units sold.

In certain previous machines, provision is made for obtaining and setting up a summary of product results. Such summary of products comprised a summation of the products obtained from each of a series of records. Heretofore, the summary of product results was merely visually indicated, but in certain cases a record of a summary of products is desired.

According to the present invention, provision is made for obtaining a record of such summary of products. According to the present invention where computations are carried out of the general form $A \pm (B \times C) = \text{result } R$ and where $B \times C = \text{intermediate result } R'$ provision is made for obtaining a summary of a number of computed results R and recording such summary by punching the same. Provision is furthermore made for obtaining a summary of a series or number of intermediate results $R'$ and for recording such summary of intermediate results.

A further feature of the present invention resides in the provision of a construction wherein groups of detail cards may be used each group being separated from a following group by a so-called summary card with a special characteristic designation thereon. Provision is made for automatically recording upon the summary card a summary of computed results obtained from all of the preceding groups of detail cards and for then clearing the machine so that a new group of detail cards may be computed and the summary placed upon the summary card which follows that group of detail cards and so on. Provision is furthermore made for recording upon the summary card two summary amounts. One amount represents the summary of the complete results obtained from a series of preceding $A \pm (B \times C)$ computations and the other summary is a summary of the intermediate results obtained by multiplying $(B \times C)$.

The present invention has for its general objects the provision of an accounting machine adapted for carrying out computations and recording results of the general type set forth above.

Further and other objects of the present invention will be hereinafter set forth in the accompanying specification and claims and shown in the drawings, which by way of illustration show what I now consider to be a preferred embodiment of my invention.

In the drawings:

Figures 1 and 1a, taken together, show a diagrammatic view of the various units of the machine and also show the driving devices for the various units;

Fig. 2 is a central transverse sectional view of the card handling, reading and punching section of the machine. The section is taken substantially on line 2—2 of Fig. 1a;

Fig. 3 is an enlarged front elevational view of the card handling, reading and punching section of the machine. This view also shows certain of the operating cams, emitters and cam contact devices;

Fig. 6 shows somewhat diagrammatically the arrangement of the MPRO (multiplier) readout device;

Fig. 7 is a fragmentary sectional view of the MPRO readout device;

Fig. 8 shows somewhat diagrammatically the arrangement of the MCRO (multiplicand) readout device and the driving train therefor. The readout device shown in Fig. 8 is also utilized for the net-gross accumulator, but the wiring is differently arranged as will appear on the circuit diagram;

Fig. 9 is a fragmentary sectional view of the MCRO readout device;

Fig. 10 shows somewhat diagrammatically the arrangement of the RHRO (right hand partial product) readout device and SPRO (summary product) readout devices and the driving train therefor;

Fig. 11 is a fragmentary sectional view of one of these readout devices;

Figure 13B:
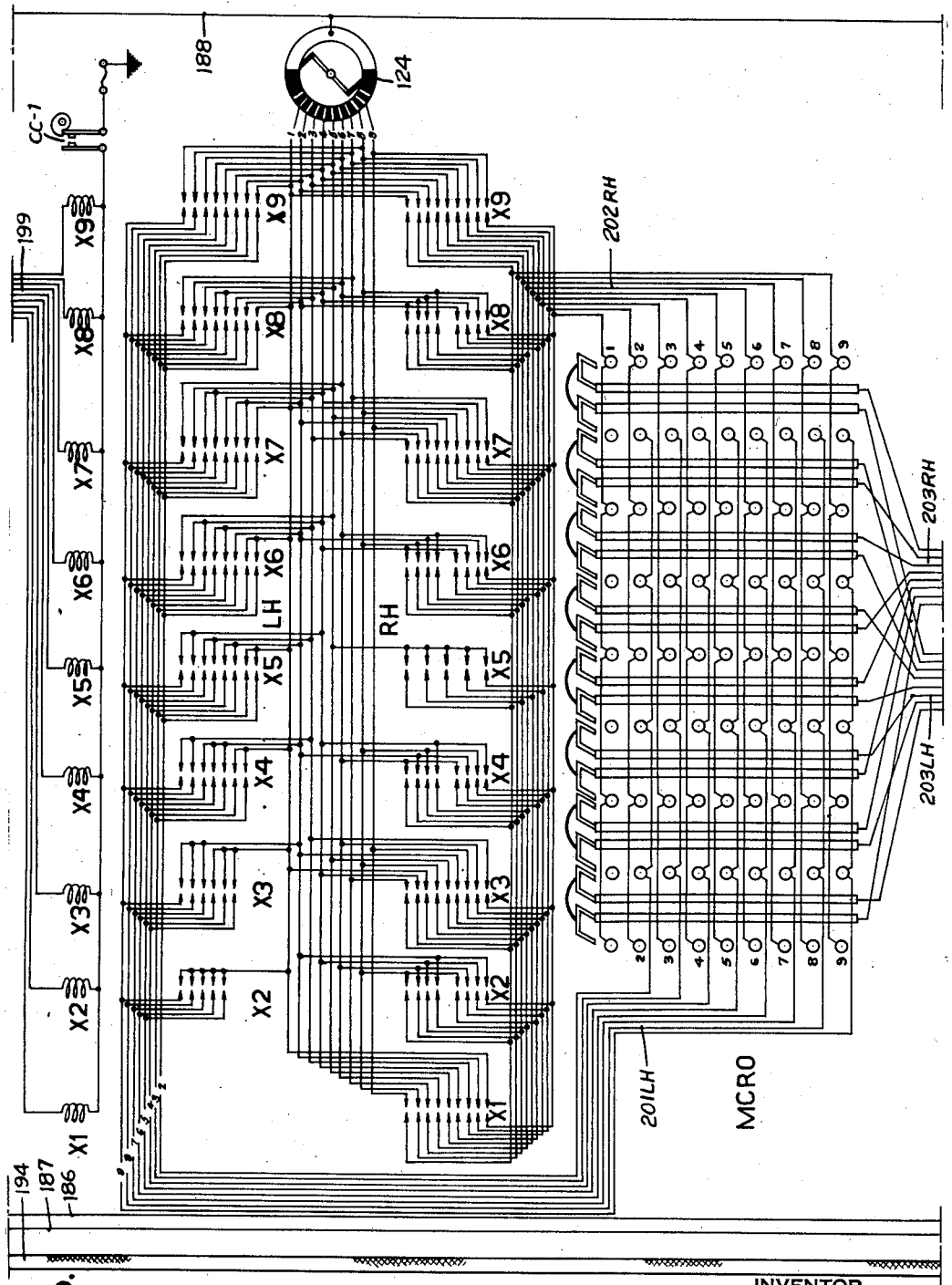
Figure 13F:
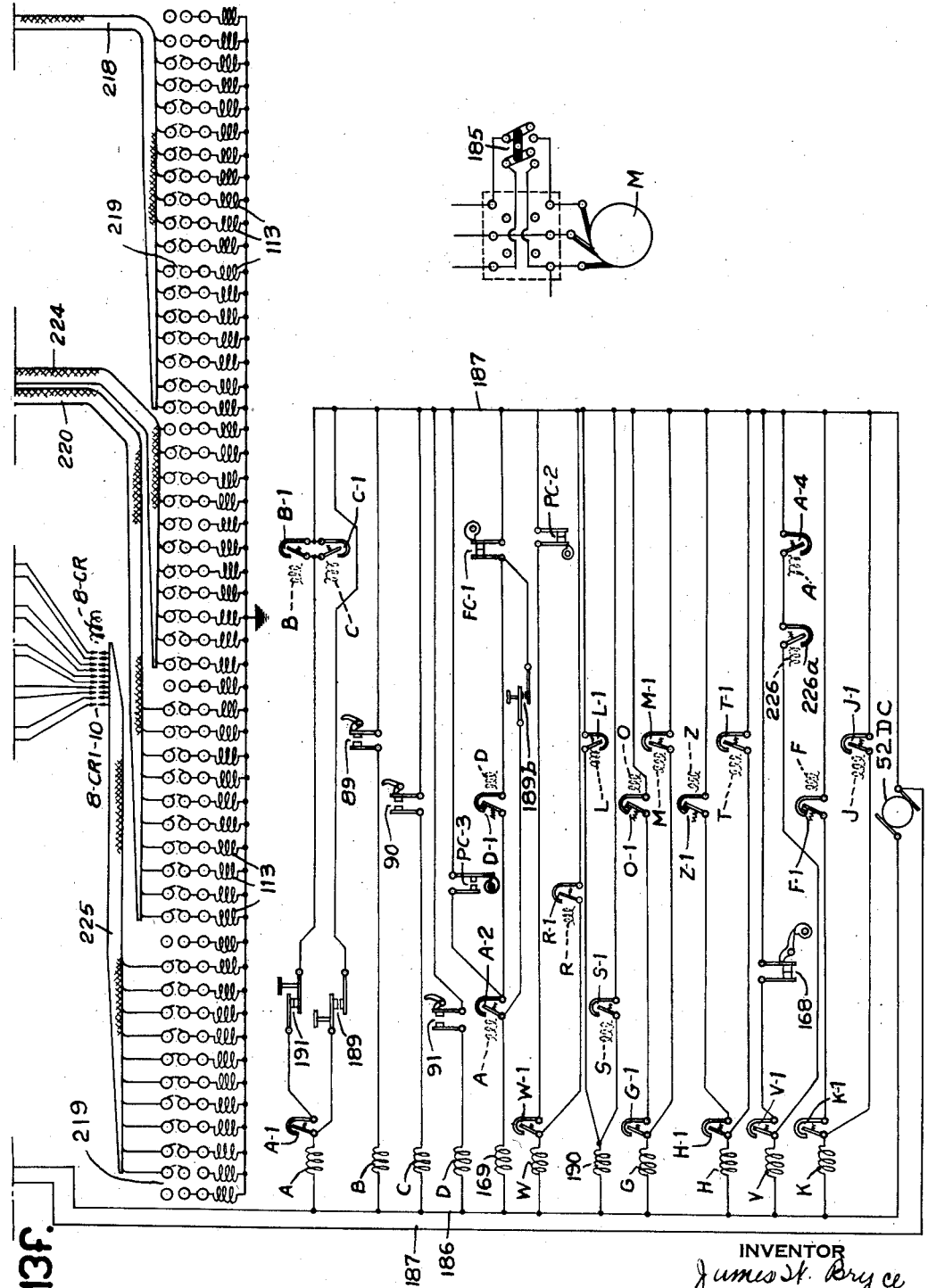
Figure 14A:
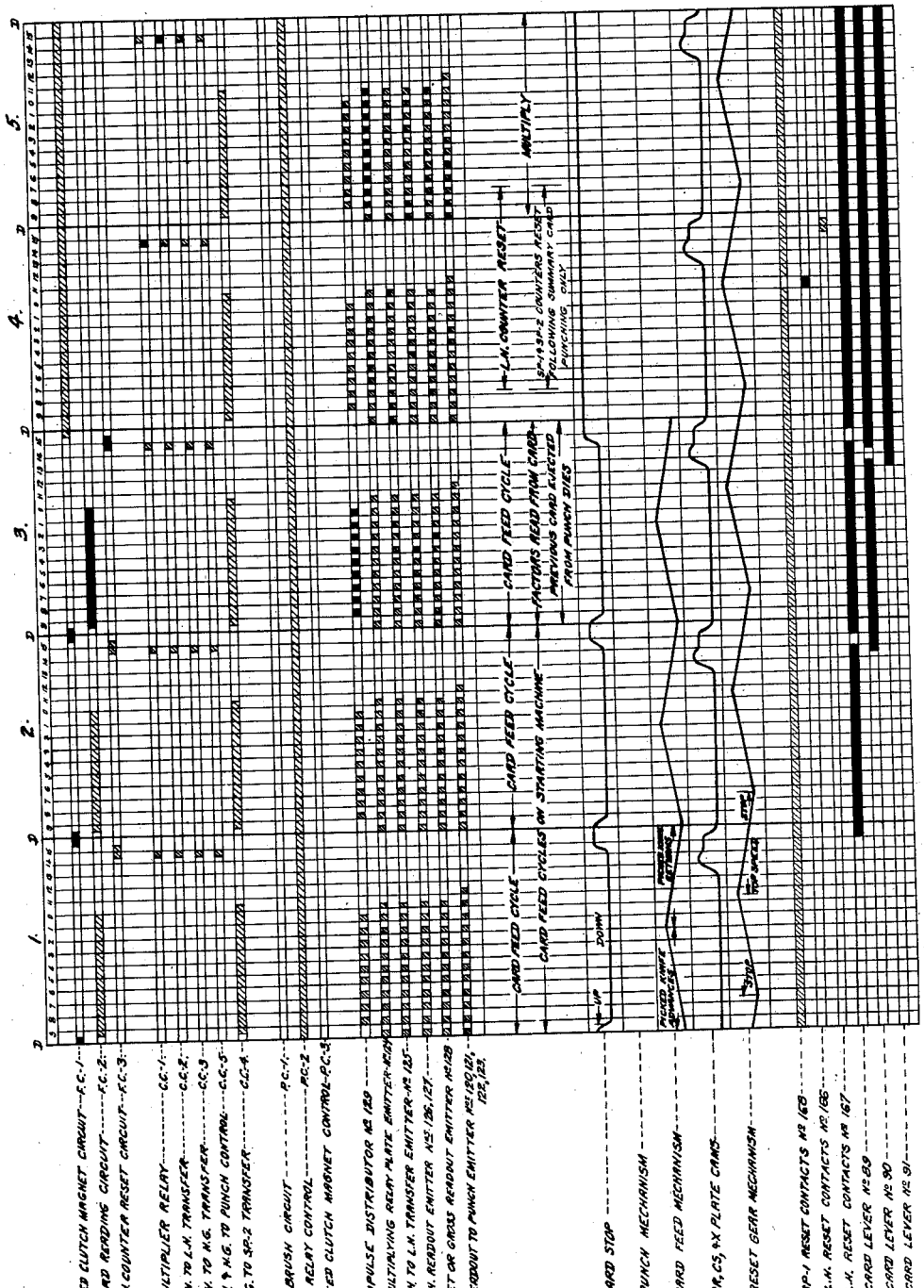
Figure 14B:
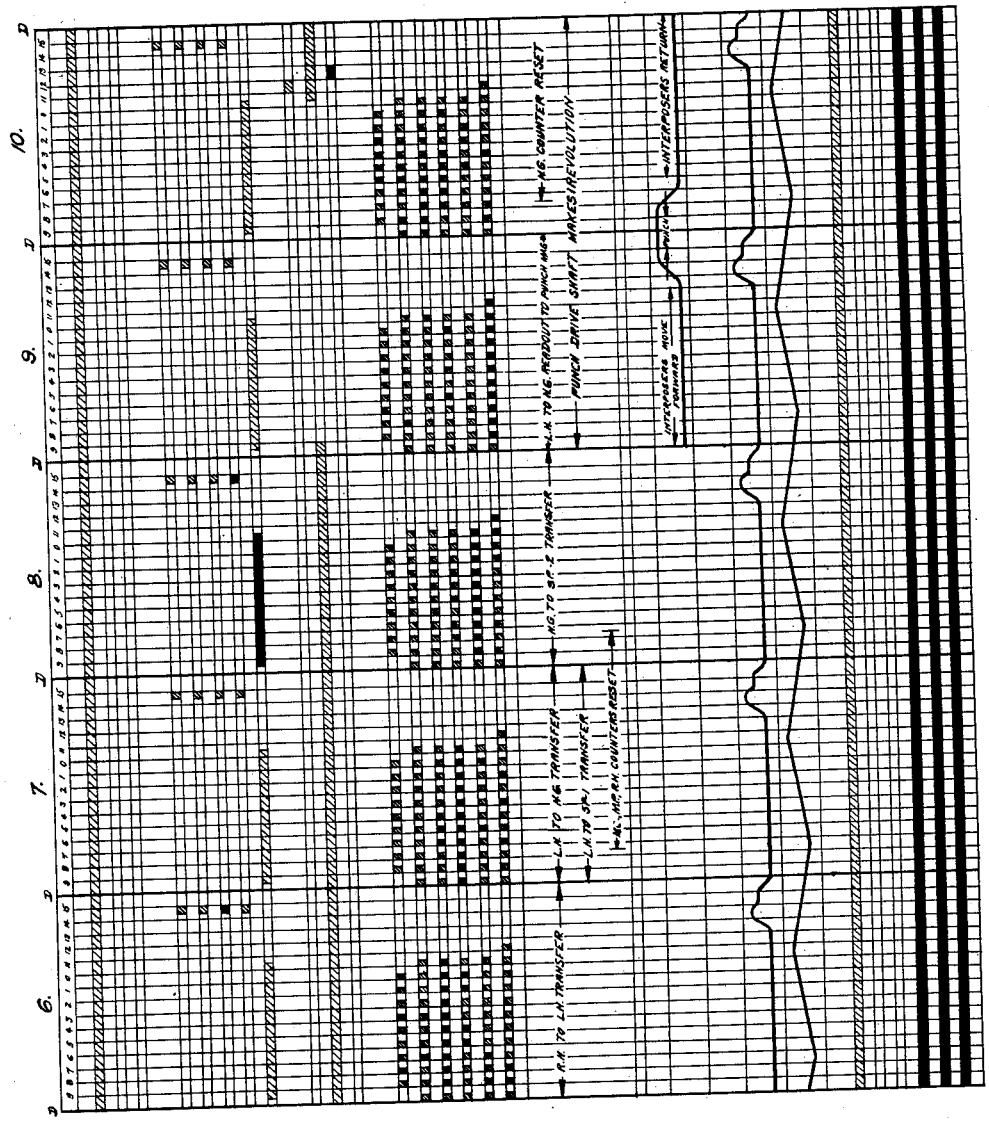
Figure 14C:
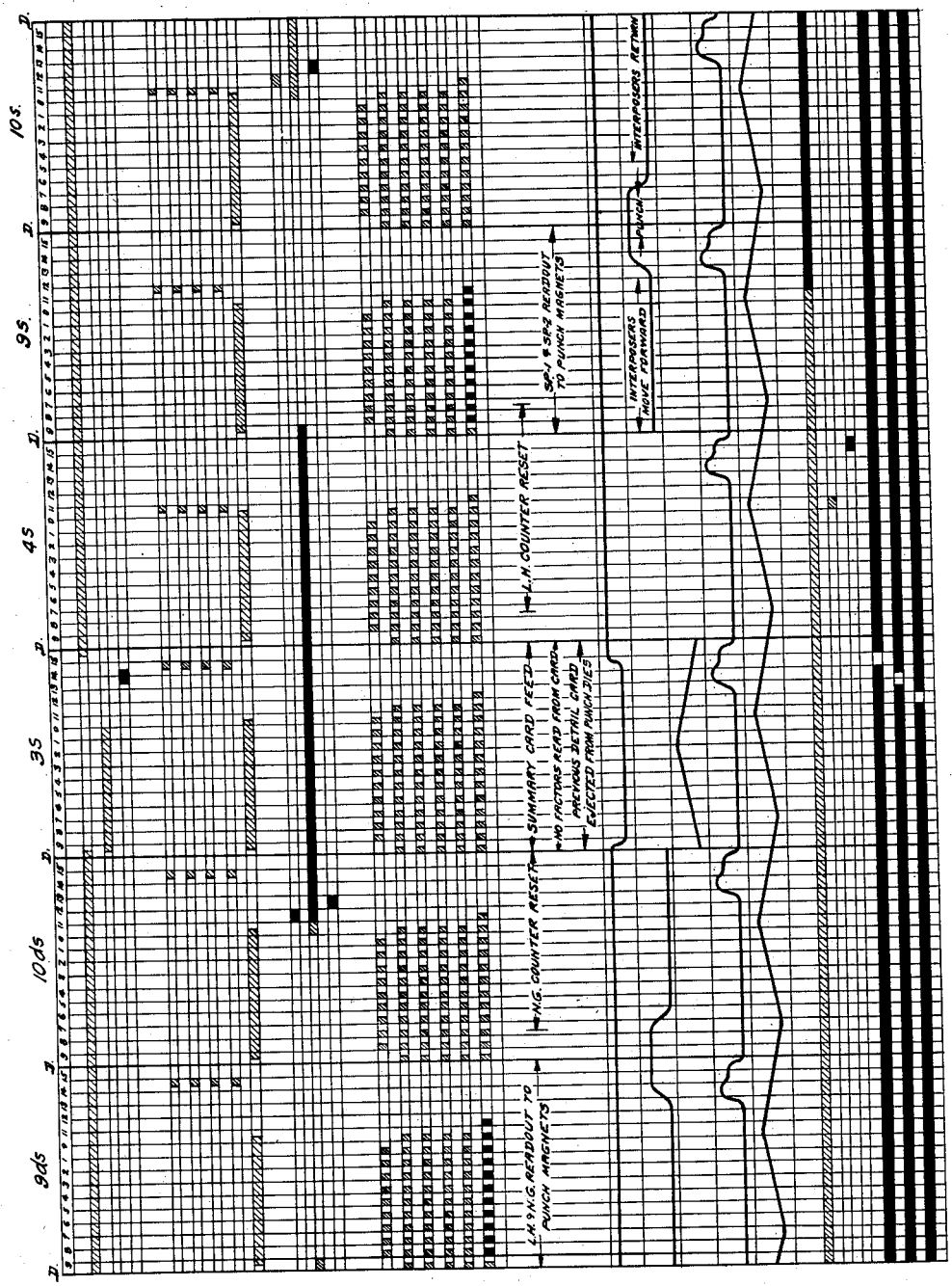

Figs. 13a, 13b, 13c, 13d, 13e and 13f taken together and arranged vertically in the order named, show the complete circuit diagram of the machine; and Figs. 14a, 14b and 14c show the timing diagram of the machine.

Before describing the details of the various parts of the machine, a general description will be given of the various units and their location in the machine. The machine embodies a card feed, card handling and a punching section which are shown in the upper right hand corner of Fig. 1a and also shown in transverse cross-section in Fig. 2. This part of the machine is arranged to feed cards and derive readings therefrom and afterwards pass the cards into a punching mechanism where each card is punched. This punching mechanism is a punching mechanism of the gang punch type wherein there is a preliminary selection of punches for punching and a subsequent concurrent displacement of the selected punches through the card.

The machine also includes a number of accumulators and receiving devices which may be enumerated as follows. In the upper part of the machine there is shown the usual RH accumulator and an LH accumulator designated RH and LH on Fig. 1. Also disposed in the upper part of the machine are two summary product accumulators designated SP—1 and SP—2. In the lower part of the machine there are three accumulators. Two of these accumulators are used as multiplicand and multiplier entry receiving devices and such accumulators are respectively designated MC and MP. In the lower part of the machine there is also a net-gross accumulator designated NG.

Figure 1:
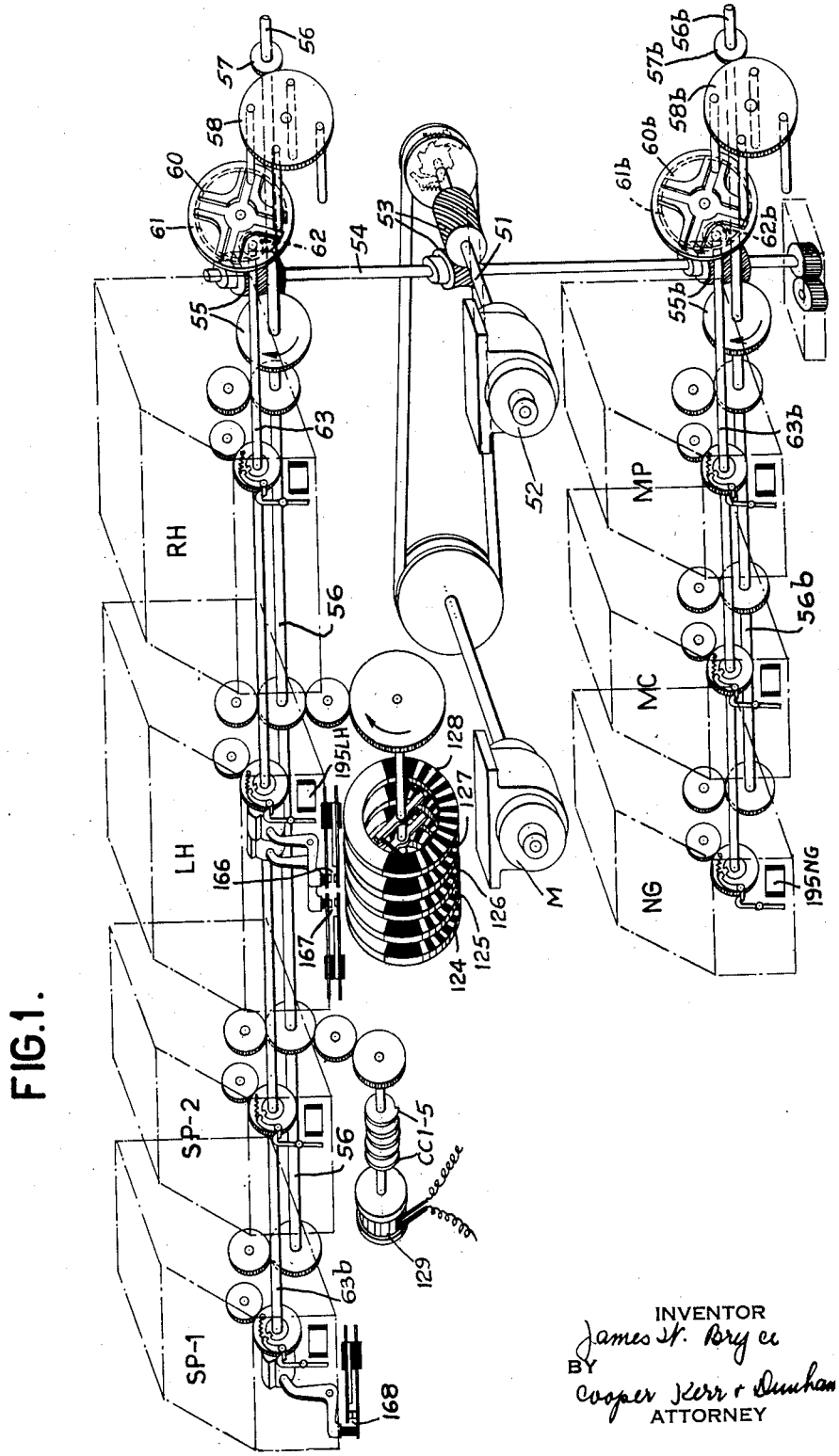
Figure 1A:
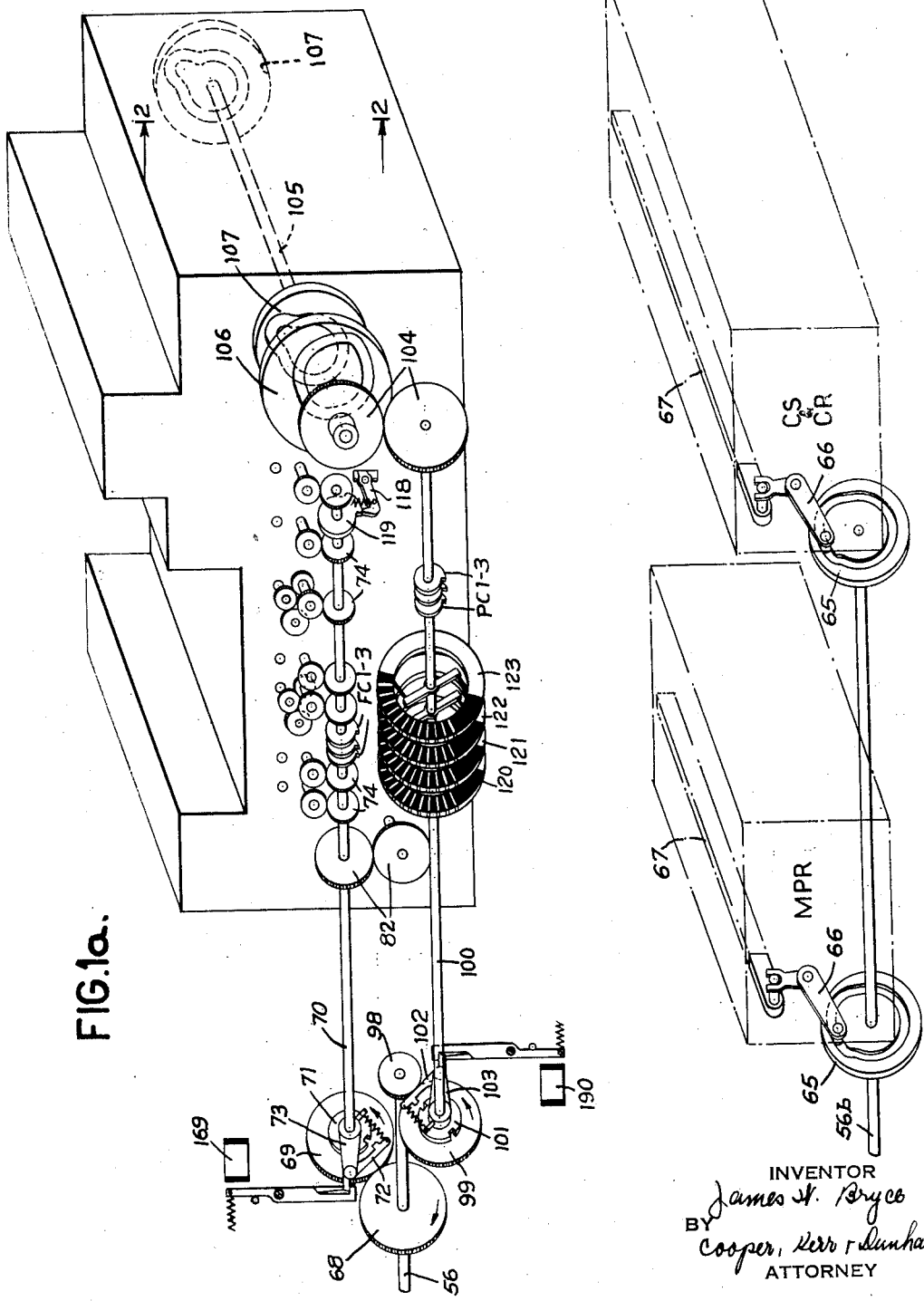

The machine also includes a multiplying panel relay unit which is in the lower part of the machine and generally designated MPR in Fig. 1a. In the lower part of the machine there is also provided the column shift unit generally designated CS. Certain additional electromagnetic multi-contact relays generally designated CR are also located in the CS section of the machine.

The machine also includes a number of emitter mechanisms and cam contact devices which will be subsequently described.

Machine drive

The machine is adapted to be driven by a constantly running motor M (Fig. 1). This motor, through a belt and pulley and ratchet drive drives a shaft 51 which shaft drives an A. C.-D. C. generator 52. The A. C. end of this generator is adapted to produce the alternating current impulses for actuating various entry receiving devices and accumulators and relay magnets and the generator 52 also has a D. C. (direct current) takeoff section. Thus the generator is provided with both slip rings for taking off the A. C. impulses and commutators and brushes for taking off direct current. Shaft 51 through worm gear drive 53 drives a vertical shaft 54, which shaft drives the units in the upper section of the machine and the units in the lower section of the machine. The drive to the units in the upper section will be first described.

Shaft 54 at its upper end, through worm gearing 55, is adapted to drive the counter drive shaft 56 of the machine. The various counters in the upper section of the machine are driven from this counter drive shaft in the customary manner. The drive for the reset of the various upper units is effected in the following manner. Shaft 56 is provided with a spur gear 57 driving a gear 58 with a four to one drive ratio. Gear 58 has extending from it four Geneva pins cooperating with the cross element of the Geneva designated 60. Secured to the element 60 is an internal gear 61 which gear has cooperating with it a spur gear 62 mounted on the end of the reset shaft 63.

The drive for the units in the lower part of the machine is substantially the same as previously described, that is shaft 54 through worm gearing 55b drives the lower counter drive shaft 56b. A similar Geneva drive 57b, 58b and 60b is adapted to drive an internal gear 61b which in turn drives the pinion 62b mounted on the end of the lower reset shaft 63b. The upper and lower reset shafts 63 and 63b reset the accumulators in the upper section of the machine and the accumulators and/or entry receiving devices in the lower section of the machine in the customary manner. The lower drive shaft 56b also extends to the right and drives operating cams 65 which cams are adapted to operate bell crank follower members 66 and slidably shift serrated operating bars 67 for the multi-contact relay devices.

Card feed, card handling and reading and card punching unit drive

Referring to Figs. 1a and 3, the shaft 56 at its extreme right hand end is provided with a gear 68 which drives a gear 69 freely rotatable upon a shaft 70, but having fast to it the notched element 71 of a one revolution clutch. The complemental part of this one revolution clutch comprises a pawl 72 carried by an arm 73 which is fixed to shaft 70. This one revolution clutch is of the customary type used in tabulating machines and the clutch is engaged by the energization of the usual clutch magnet 169. With the clutch engaged, shaft 70 will rotate in unison with gears 69 and 68 and in unison with the counter drive shaft 56. With the clutch disengaged, shaft 70 will be stationary, while shaft 56 will continue its rotational movement. Shaft 70 through spiral gearing generally designated 74, drives the lower of a series of pairs of card feed rolls designated 75, 75a and 75b. The shaft 70 also drives the two gears on contact rolls 76 and 77 (see Fig. 2) by gearing extending to certain of the rolls 75 (see Fig. 3). Cooperating with the lower feed rolls 75 are upper feed rolls 78 of the usual construction. These rolls 78 are preferably gear driven in unison with the lower feed rolls. An upper roll 78a is also provided, which roll is frictionally driven. A roll 78b is also provided which roll may be positively driven in unison with the cooperating lower roll 75b. Preferably the rolls 75a and 78a and 75b and 78b are arranged to rotate at a slightly higher rate of speed than rolls 75 and 78 for a purpose to be hereinafter described.

The machine is provided with the card supply magazine 79 and the usual discharge hopper 80. A picker 81 which is of conventional construction and crank operated is driven in any suitable manner from the driving shaft 70, as by the driving train 82 shown in Fig. 3.

The machine is provided with advance sensing brushes 83 and a second set of sensing brushes 84, which respectively cooperate with the contact rolls 76 and 77. As stated before the contact rolls 76 and 77 are driven from the shaft 70 (see Fig. 3) and preferably the drive is such that these contact rolls slip slightly relatively to the card to cause a slight slipping or creeping action of the contact rolls. A leading and a lagging X brush 85 and 86 are provided which respectively cooperate with segment blocks 87 and 88. The usual card lever operated contacts 89 and 90 are also provided which are adapted to be closed upon the passage of cards thereunder and to open up upon the failure of a card to cooperate with the respective card levers. Another card lever with associated contacts 91 is provided in the punching section of the machine. A card leaving the right hand pair of rolls 78 and 75 enters a punching die comprising upper and lower die plates 92 and 93. Sets of rows of punches 94 are provided suitably supported for sliding movement in a punch operating frame generally designated 95. A series of interposer selector bars 96 are provided, one interposer selector being provided for each row of punches and each selector bar carries on its end a punch operating plunger 97, which plunger slides over the tops of the punches 94 and below the top of the punch operating frame 95.

The drive for the punching section of the machine is as follows. Referring again to Figs. 1a and 3, the shaft 56 is provided with a gear 98 which in turn drives a gear 99 freely rotatable on a punch operating drive shaft 100. Gear 99 has fast to it the notched element 101 of a one revolution clutch and the complemental part of this clutch comprises a pawl 102 carried by an arm 103 which is fixed to the shaft 100. This one revolution clutch is of the usual electromagnetically controlled type and when engaged by the energization of the punch clutch magnet 190, shaft 100 is turned through one complete revolution upon two complete revolutions of the main counter drive shaft 56. In view of the two to one driving ratio the notched element 101 is provided with two notches to receive the pawl 102 in either of two positions. Shaft 100 near its right hand end, through spiral gearing generally designated 104 (see also Fig. 3) drives a cam shaft 105. Cam shaft 105 is provided with an interposer cam 106 (see Fig. 3) and punch operating cams 107. The interposer cam 106 is adapted to shift a crank follower 108 and shift a cross-bail 109 back and forth on slide rods 110 (Fig. 2). The interposers 96 are impositively driven from the cross-member 109 in any suitable manner as by spring pressed pawls 111. The interposers are selectively positioned over the punches by means of pawls 112 which engage ratchet teeth in the top of the interposer bars in the usual manner. Pawls 112 are electromagnetically tripped by punch selector magnets 113. After a given interposer bar or bars have been selectively positioned under the control of the punch selector magnets the punches which are under the ends of the punch operating plungers 97 will be positively forced through the card by the punch operating cams 107 (Fig. 3), which cams through a linkage 114 are adapted to operate a suitable operating means for the punch frame 95, such operating means being here shown as a toggle 115 (Fig. 3).

It will be understood that cards will be picked from the magazine 79 (Fig. 2) and in one counter cycle the cards will be passed to a position in which the leading card is about to be read by the set of brushes 83. The card on the next counter cycle will pass to the next reading station and on the following counter cycle it will pass into the punching die. The card is arrested in the punching die by a card stop 117 which card stop cooperates with the pivoted arm 118, coacting with a cam 119 disposed on shaft 70 (see Figs. 1a and 3). With the card stop 117 elevated, the card will be arrested in proper position in the punching die. The feed rolls 78a and 75a urge the card into cooperation with the card stop and after the card has been intercepted by the card stop slip relatively thereto before their rotational movement terminates. Upon withdrawal of the card stop after punching the card will be ejected from the punching die by the rapidly moving rolls 78b and 75b and delivered to the discharge stack.

It will be understood that a card is removed from the die plates 92 and 93 during a card feed cycle, in which a new card is being introduced into the die and being sensed and the one revolution feed clutch permits a card to be advanced through one station and then arrested for an indefinite number of cycles and the one revolution punch clutch permits the punch to be called into operation after the requisite number of computing cycles. Upon the completion of punching, a new card feeding and reading cycle may ensue.

*Emitters and cam contacts*

The main drive shaft 56 is adapted to drive the cams of certain CC cam contact devices, such cams being correspondingly numbered on Fig. 1 as CC—1 through 5 inclusive. Upon the shaft 70 (Fig. 3) there are provided the cams of a number of FC cam contacts. Such cams are correspondingly designated FC—1 through 3 inclusive on Fig. 3. The punch operating drive shaft 100 also drives the cams of a PC group of cam contacts. Such cams are correspondingly designated on Fig. 3 as PC—1 through 3 inclusive. Also driven from shaft 100 are four emitters 120, 121, 122 and 123. The machine is also provided with another series of emitters which are of conventional construction and which are driven from the main counter drive shaft 56 (see Fig. 1). Five of such emitters are provided which are designated 124, 125, 126, 127 and 128. An impulse distributor 129 is also provided which is driven in unison with the cam contacts CC—1 to 5.

Reset controlled contacts

Referring to Fig. 1, the reset gear of the LH accumulator is shown as provided with cams adapted upon the reset of this accumulator to cause closure of contacts 166 and 167. Similar reset contacts are shown on the SP—1 accumulator, these being designated 168. Such 168 contacts, however, are normally closed contacts and are arranged to open up upon the reset of the SP—1 accumulator and to reclose at the end of the resetting operation.

The foregoing description has described the manner in which cards are drawn in succession from the supply magazine and the manner in which the cards are carried past the various sensing brushes and delivered into the punching section of the machine. With the traverse of each card past the sensing brushes 84, the various amounts are read from the card and entered into the receiving devices of the machine. In the present invention the advance reading brushes 83 and the advanced control brush 85 are not used. These are used with other computations and here shown only for uniformity of illustration.

The receiving device and accumulators are of the usual type as customarily used in tabulating machines and are provided with electromagnetically actuated clutches. The various accumulators and receiving devices have commutator type readout devices which will now be described.

Referring now to Figs. 6 and 7, 130 is a clutch gear pertaining to the units order of the MP (multiplier) receiving device. Gear 131 is driven from this clutch gear and this gear in turn drives two brush assemblages, one designated 132U, which traverses a set of segments 133 and also a current supply segment 134. There is another brush assemblage 135U driven by gear 131 which brush traverses a segment generally designated 136 and which segment is provided with a single conducting spot at the zero position. The brush 135U also traverses a common supply segment 137. There is a similar brush 135T which is positioned from the tens order clutch wheel 138 and which also traverses the segment 136 which contains only the single conducting spot at the zero position. Brush 135T also traverses a separate common current supply segment 139. Similarly there is a brush 132T driven in unison with brush 135T which traverses the segment spots 140 and which receives current from the common current supply segment 141. This arrangement of brushes and segments is repeated for higher orders in the MP readout device, i. e. each alternate segment is like 136 with only a single spot in the zero position on each segment. Alternating with these segments are other segments similar to 133 and 140 with a multiplicity of spots on each segment. The detail construction of this readout with its brush assemblages is shown in the cross-sectional view Fig. 7. The wiring of the readout will be more fully set forth in connection with the circuit diagram (see Fig. 13a).

MC and NG readouts

Referring now to Figs. 8 and 9, in Fig. 8 is shown the brush driving arrangement for the MC and NG readouts. In this embodiment the units clutch gear train 142 drives a units brush assemblage 143U which cooperates with a set of segments 144 which receive current from a common conductor segment 145. Similarly units driving train 142 drives a brush assemblage 146U receiving current from a conductor segment 147 and cooperating with segments 148. Also cooperating with segments 148 is another brush assemblage 146T receiving current from a conductor segment 149, which brush assemblage cooperates with the segments 148 and which brush is driven by the tens order clutch train 151. This arrangement is repeated for relatively higher orders.

RH, SP—1 and SP—2 readouts

Fig. 10 shows the general arrangement of the readouts for the RH accumulator, the SP—1 accumulator and the SP—2 accumulator. With a readout mechanism of this sort, it will be noted that the segment spots 152 are common to two sets of brush assemblages designated 153 and 154 respectively and which brushes cooperate respectively with conducting segments 155 and 156. Brush 153 as shown in Fig. 10 is driven from the units order clutch gear train 157. Brush 154 on the other hand is driven from the tens order clutch train 158 by the gearing diagrammatically illustrated.

A similar arrangement of brushes and readout spots is provided for the relatively higher orders of these accumulators and the wiring of these readouts is shown on the circuit diagram (see Figs. 13c and 13e). Fig. 11 shows the details of construction.

LH and IVL readouts

Figure 12:
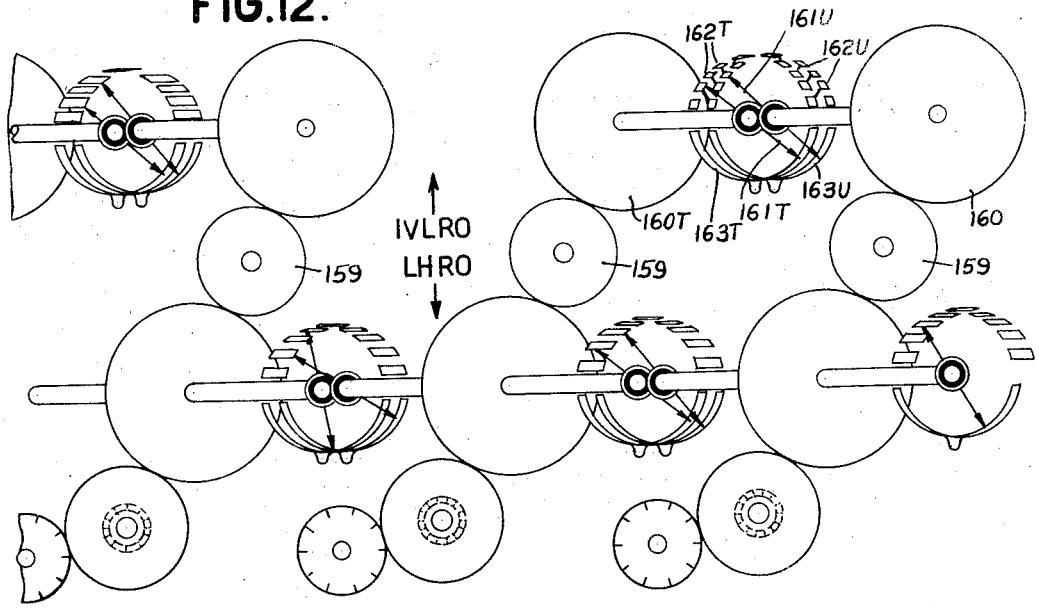
Fig. 12 shows a dual readout device which is used for the LHRO (left hand partial product) readout.
Figure 12A:
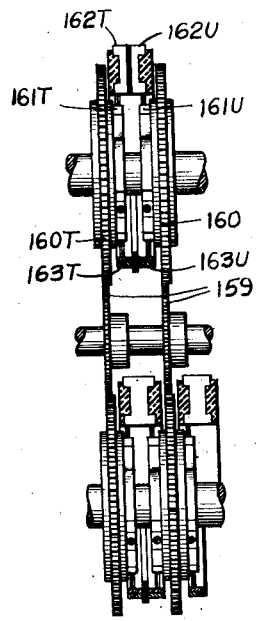
Fig. 12a is a detail sectional view of the dual readout device shown in Fig. 12.

Referring now to Fig. 12, and Fig. 12a, this readout which is here shown and which is used for the left hand accumulator, comprises a lower section which is substantially identical in construction to the MCRO readout previously described. The readout is, however, provided with a concurrently driven upper section of somewhat different construction and differently wired. The brush parts of the upper section are driven by intermediate gears 159, one of which is provided for each denominational order. The upper section is substantially of the form of readout used for an inverting accumulator wherein readings are to be taken from an accumulator which are complements of the amounts standing thereon. Such upper section will be accordingly designated IVLRO. The lower section from which real number amounts are read out is designated LHRO.

The construction of the upper section will now be described. The intermediate gear 159, pertaining to the units order, through gear 160 drives brush 161U which traverses the units segment spots 162U and a supply segment 163U. The tens intermediate gear 159 drives a brush assemblage 161T through the intermediate gear 160T. Brush assemblage 161T traverses the tens order segment spots 162T and a supply segment 163T. Segment spots 162U and 162T are diagonally transversely wired as shown. The relation of wires is such that the nine spot of the 162 U group is wired to the eight spot of the 162T group and so on. The complete wiring of this readout is shown on the circuit diagram. On higher orders the construction of this readout is the same as for the RHRO readout previously described.

Multiplying panel, column shift and multiple circuit controlling relays

Figure 4:
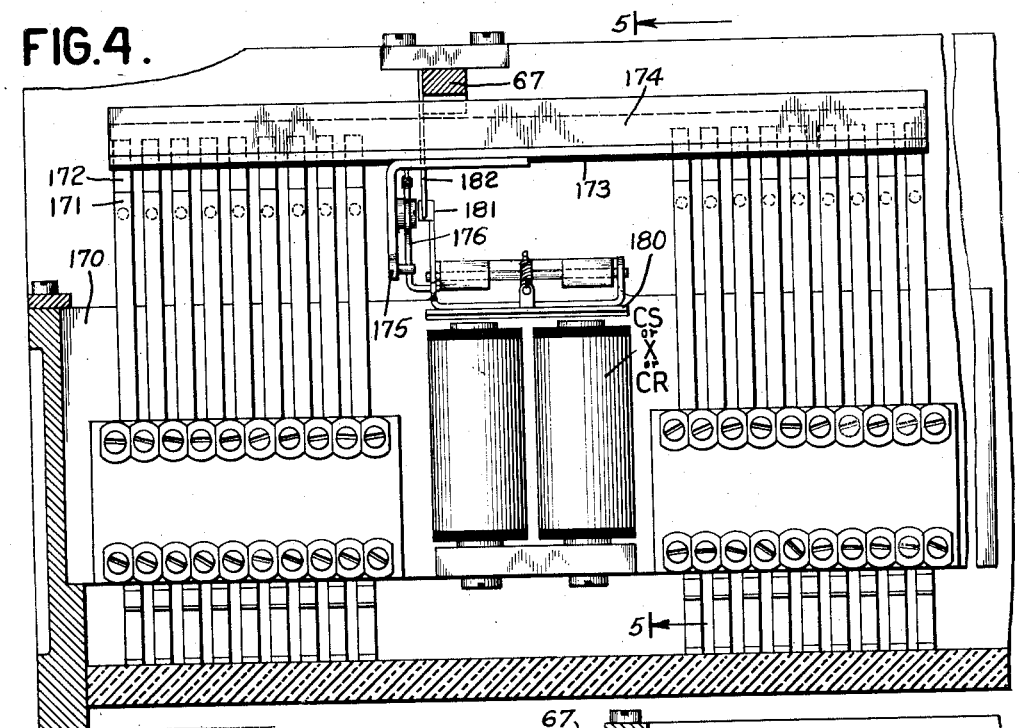
Fig. 4 is an elevational view of one of the power positioned electromagnetically controlled multi-contact relay devices which are used in the machine. Such multi-contact relays are used for multiplication selection, column shift control and for other control purposes where multiple circuits are to be broken or established concurrently.
Figure 5:
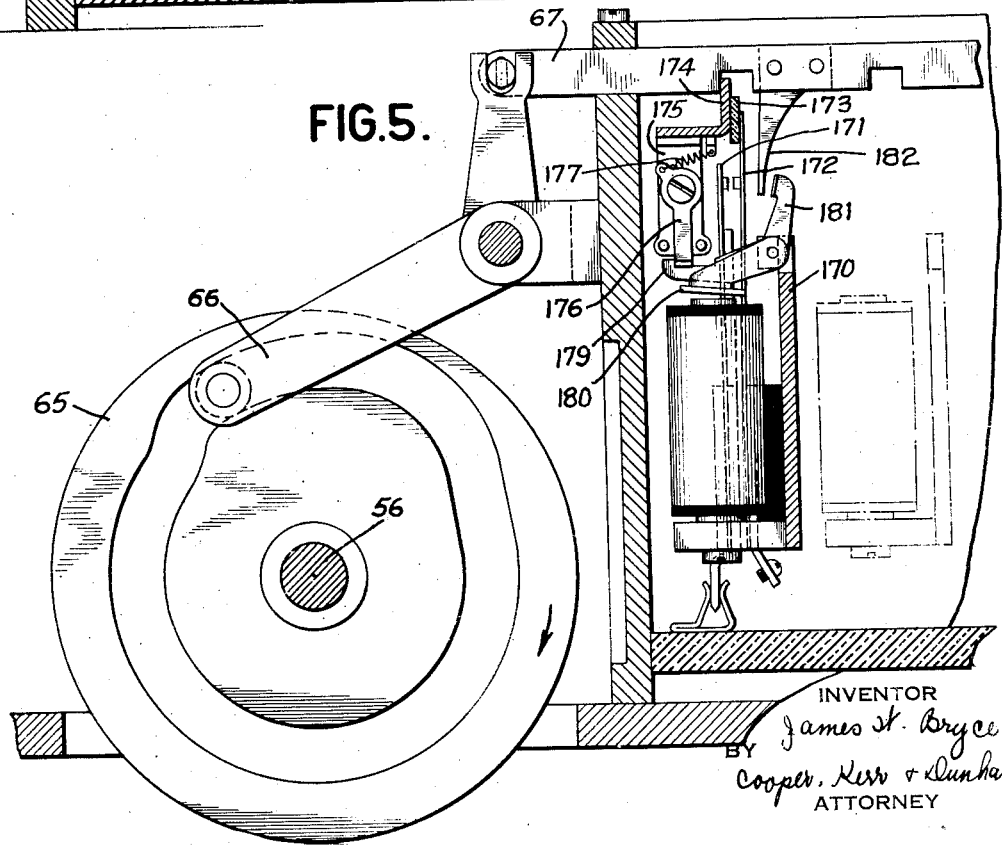
Fig. 5 is a detail sectional view taken substantially on line 5—5 of Fig. 4 and showing a multi-contact relay in preliminary position preparatory to being electromagnetically tripped and with the strain relieved from the latch point of the latch.

Numerous electro-mechanically controlled and mechanically positioned and restored multi-contact relays are used in the machine. The construction of these relays is shown in Figs. 4 and 5. Suitable side frame plates in the frame of the machine are slotted to receive a number of vertical plates 170. Carried on each plate is a magnet which will be designated CS when the relay is used for column shift purposes and X—1, X—2 and X—3 when the relay is used for multiplier selection purposes and CR when the relay is to be used for simple multiple circuit control purposes. These magnets CS, X or CR when energized, serve to control the establishment or breaking of circuits at the multi-contact points of the relay. The magnets are preferably used as trip magnets only and the armatures of these magnets are not required to actually shift their related contacts.

As previously explained the cams 65 shift their respective followers 66 and transversely shift the serrated operating bars 67. Each plate 170 in addition to providing a mounting for the magnets CS, X or CR also affords a mounting for contacts which will be generally designated 171 and 172. Contacts 172 at their upper ends have fastened thereto a strip of insulating material 173, which strip in turn has secured to it an L-shaped member 174. The member 174 has an upper portion which engages into the downwardly extending serrated notches of the serrated bar 67. Member 174 also has downwardly depending from it and fixed thereto a bracket 175, which in turn has pivotally mounted on it a latch member 176. This latch member has slight limited rocking movement between limiting stop pins and is normally urged clockwise by a spring 177. The lower end of the pivoted latch member 176 cooperates with a latch piece 179 fixed to a pivotally mounted armature 180. The armature member 180 also has an upwardly extending tail portion 181 arranged in cooperative relation with a restoring abutment 182 carried upon and depending from the serrated operating bar. With the parts shown in the position of Fig. 5, the cam 65 has shifted its follower 66 and shifted the serrated operating bar 67 to a position in which the contacts 171 and 172 are kept open and to a position in which the strain exerted by the blade contact springs 172 is removed between the latch 176 and the latch point 179 of the armature assemblage. The relay magnet may now be energized and upon being energized the latch portion 179 will be lowered allowing the latch 176 to trip over the top of the latch point, thereafter upon further rotational movement of the cam 65, the serrated operating bar 67 moves to the left and allows contacts 172 to close under their own spring action and establish contact with 171. After a set of multi-contacts have been tripped in the above manner, the operating cycle of the machine ensues and subsequently the cam 65 again shifts its follower, and causes the operating bar to take a somewhat larger extent of movement to the right to cause the armature knockoff bracket 182 to intercept 181 and rock the armature assemblage in a clockwise direction to knock off any previously attracted armature. Subsequent movement of the cam allows the serrated operating bar to move back to the position shown in Fig. 5. If a given magnet is not energized, its corresponding armature will not be attracted and the latch member 179 will then prevent a closure of contacts 171 and 172.

In the foregoing description the contacts generally designated 171 and 172 have been described as being normally open contacts. Such contacts may also be of the normally closed type and will be arranged to open up upon the energization of a controlling magnet and upon the shift of the serrated bar. In the subsequent description of the wiring diagram, certain contacts which have been generally designated 171 and 172 in the present mechanical description of the multi-contact relay, will be given designating reference numerals related to their associated control magnets. Thus 1—CR 1—18 will designate the eighteen contacts controlled by the magnet 1—CR, 2—CR 1 to 8 will designate the eight multi-contacts controlled by relay magnet 2—CR and so on.

General operation of the circuit diagram

Before describing the circuit diagram of the machine, a brief explanation will be given of the general type of problems which the machine is adapted to handle.

In certain classes of calculating work, problems are presented of the following typical forms— $A\pm(B\times C)$ =result $R$. With problems of this sort it is sometimes desirable to obtain a separate record of the $B\times C$ intermediate result ($R'$) of the calculation and to record such intermediate result of $R'$. It is also sometimes desirable to separately also record the final result of $R$.

In other cases in accounting operations it is required that there be a summation of results and a recording of such summation. It is also desirable to provide for a summation of the $B\times C$ intermediate results of the computation and to record such summation. The machine is adapted for this sort of accounting operations.

In practice the amounts, components or factors A, B or C would preferably be punched on record cards, all three factors or components appearing on the same card. If $B\times C$ were to be subtracted from A, such cards where subtracting operations were to be performed, would be separated from the other cards which required adding and the subtracting cards would be separately run through the machine. A suitable switch is provided in the machine to set the machine for subtracting computations or adding computations.

In the operation of the machine, the machine not only automatically effects the subtraction of $B\times C$ from A, but in addition the $B\times C$ intermediate results of a series of computations from a series of cards are added into one of the summarizing accumulators SP—1. Also the final results of numerous $A-B\times C$ computations are added into another summarizing accumulator SP—2. At the end of a run of cards these summations may be read from the respective accumulators. Furthermore, during the operation of the machine, $B\times C$ components of each computation can be recorded back upon the card from which the factors were derived and also a complete result of $A-B\times C$ can be recorded back upon the card from which the computation was derived. Such recording is preferably effected by punching. If desired a number of detail cards can be followed by a summary card and provision is made for effecting the recording of summation amounts on such summary card. The summary card can be used intermediate or interspersed between separate groups of detail cards and when such summary card passes through the machine, the recording of the summary or summaries is automatically effected and the machine then proceeds on a new series of computations with the succeeding cards of a group of detail cards.

The above general statement of the operations applies equally well to the case where the $B \times C$ intermediate result of the calculations is to be added to the A component of the calculations.

In describing the circuit diagram an explanation will be first given of the operation of the machine for an $A-(B \times C)$ computation, thereafter a brief explanation will be given of the manner in which $A+(B \times C)$ computations are computed and following this a description will be given of the operation of the machine with summary card control.

The pre-punched cards are first placed in the card magazine 79 (Fig. 2). The first operation comprises the closure of the switch 185 (Fig. 13f) providing a source of current supply for the main driving motor M. Rotation of the motor M starts the drive of the A. C.-D. C. generator 52 and supplies direct current to the D. C. buses 186 and 187. Alternating current impulses are likewise impressed upon bus 188 and to ground. Start key 189 (Fig. 13f) is now depressed which completes a circuit from the 186 side of the D. C. line through relay coil A to the 187 side of the line. With relay A energized, relay points A—2 are closed and a circuit is established through the card feed clutch magnet 169 (see also Fig. 1a), through relay points A—2, through relay points D—1 now closed, through cam contacts FC—1 now closed and back to the other side of the D. C. line. With the card feed clutch magnet 169 energized, a card feed now ensues and the first card (lowermost card in magazine 79) advances to a point where the brushes 83 are about to read the card at which point card lever contacts 89 become closed. The closure of card lever contacts 89 energizes relay coil B and the energization of this coil closes relay points B—1 and establishes a holding circuit for relay coil A, through relay points A—1 and stop key contacts 191 now closed. On starting the machine it is necessary to hold down the start key until card lever contacts 89 become closed.

It may be explained that in the present machine reading is not effected at brushes 83 or at the special advance brush 85. Reading of the component factors from the card is effected by the reading brushes 84. During the transit of the first card to the first reading brushes 83, the cam contacts FC—1 will have momentarily opened but will have become closed again. The reclosure of these cam contacts re-energizes the card feed clutch magnet 169 through the circuit previously traced and this re-energization causes the first card to be carried over to a position in which it is about to be read by the brushes 84. During the second card feed cycle of the first card there will be a pick-up and feed of another card into the first sensing station. When the first card reaches the 84 brush station, card lever contacts 90 become closed and the closure of these contacts establishes a circuit to energize the C relay coil. The energization of relay coil C will close points C—1 to maintain coil A energized through the stop key contacts 191 and A—1. The card lever contacts 90 close before card lever contacts 89 open.

The machine is now ready to read out the components from the first card. Upon the transit of the first card to the second sensing station at brushes 84 there is again a reopening of FC—1 and the reclosure of these contacts re-energizes the card feed clutch magnet 169 and causes the third card feed cycle to ensue carrying the first card past the sensing brushes 84 and introducing a third card from the magazine 79 and advancing the second card from the initial to the second station. The energization of relay coil C in the manner previously described will have closed relay points C—2 (Fig. 13a). With relay points C—2 closed alternating current impulses are supplied from the A. C. line 188 through the C—2 contacts, through the FC—2 contacts to the impulse distributor 129. The impulses flow to the contact roll 77, through relay points W—4 now closed. The card in passing the brushes 84 and contact roll 87 is read in the usual manner and the three component amounts A, B and C are introduced from the card into the NG accumulator or entry receiving device, the MC accumulator or entry receiving device and the MP entry receiving device. Their magnets are correspondingly numbered 192NG (see Fig. 13e), 192MC and 192MP (Fig. 13a).

The usual plug board 193 (Fig. 13a) is provided intermediate the brushes and the accumulator magnets.

It may be explained that the entry of the amount into the NG accumulator is via the wires in the cable 194 and these wires extend to the contacts of the multi-contact relay which are generally designated 1—CR 1—10. The contacts of this multi-contact relay are normally closed and are arranged to be opened after the A amount or component is read from the card and at a later time in the machine operation. Following the cycle in which the components A, B and C are read from the card, the card is introduced into the punching die section where it remains during subsequent computing operations. The first card upon reaching the punching die section closes card lever contacts 91 and the closure of these contacts energizes relay coil D (Fig. 13f). The effect of the energization of relay coil D is to open contacts D—1 and prevent subsequent unwanted card feed cycles until a new computation on a following card is to be effected. The energization of relay D (see Fig. 13a) has closed relay points D—2 and upon closure of cam contacts FC—3 a circuit is established from the A. C. line 188 to the reset magnet 195LH which is the reset magnet of the LH accumulator (see Fig. 1). Reset of the LH accumulator now takes place in the usual way. The effect of the reset of the LH accumulator is to cause contacts 166 to become closed.

Referring to Fig. 13a, the MP readout is designated MPRO and the zero spots of this readout are wired to the contacts 166 by a wire 197 through relay points W—2 which are normally closed. The cycle controller and zero column skipping arrangement herein shown is more fully described in the United States patent to Cunningham, No. 1,933,714, dated November 7, 1933, but in brief it comprises a number of relay points $Yu$, $Yt$, $Yh$, etc., $u$, $t$ and $h$ designating units, tens and hundreds orders. The relay coils Y have two sets of relay points, one set $Yu-1$, $Yt-1$, etc., being stick contacts and the other sets of points being for column selection and column shift control purposes. Such other sets of contacts are generally designated $Yu-2$, $Yt-2$, etc. The magnets of the CS relays previously referred to are designated CSu, CSt, CSh, etc. These column shift relays in addition to having the column shift control contacts which have been previously designated 171 and 172 have each an additional contact pair which will be given a general designation CSu—3, CSt—3, etc.

If any brush of the readout device stands upon a zero spot, its corresponding Y magnet will be energized, current flowing from the D. C. line 187 through the LH reset contacts 166, relay points W—2 now closed, via wire 197 to the zero spots of the readout, thence via the corresponding brush or brushes standing on the zero spot or spots and then through the respective circuits shown to the respective Y magnets. It will be noted that when the LH reset contacts 166 become closed a circuit is established from 187 side of the D. C. line to the 186 side, through relay coil N. The energization of relay coil N causes relay points N—2 to become closed and establishes a stick circuit for coil N through relay points N—2 and contacts 2—CR—18 now closed, back to the other side of the D. C. line. With coil N energized and with the points N—2 closed, a circuit is established from the 187 side of the D. C. line through the contacts designated 2—CR—18, through points N—2 to wire 198 which extends over and connects with one side of each of the CSu—3 to CStm—3 group of contacts. The other side of these respective contacts are wired back to their corresponding Y magnets and therethrough to the other side of the D. C. line. Accordingly, when any Y magnet becomes energized due to a brush standing on the zero spot in the readout in its corresponding column, the energization of this Y magnet will establish its corresponding Y—1 stick contacts and the Y magnet will remain energized by the current which flows over to it through line 198.

It will be assumed that the multiplier amount of component C is such that there is no zero in the units order, but that there is a zero in the tens order and that there is a significant figure in the hundreds order. In this position Yt will become energized and will be held energized by its stick relay points Yt—1. The energization of Yt will shift contacts Yt—2 to the reverse position from that shown. The stick circuit energization of the Yt magnet will maintain these contacts Yt—2 shifted. Yu—2 will not have been shifted because its corresponding Yu magnet has not been energized. The same will apply to the Yh—2 contacts.

The machine is now ready to multiply by the amount in the units order of the multiplier. Initiation of multiplication is effected in the following manner. The energization of coil N closes relay points N—1 and current is allowed to flow from the A. C. line 188 through points N—1, through the Yu—2 contacts which are in the position shown down through the CSu magnet and out via the units brush of the MPRO readout which is standing on say the five spot down through the fifth line of the group of wires generally designated 199 to the X—5 multiplying relay control magnet (see Fig. 13b) and back to ground. The time of flow of current to the path just traced is timed according to the closure of cam contacts CC—1 (Fig. 13b).

There will accordingly be a concurrent energization of the CSu magnet and the X—5 multiplier relay control magnet, such magnets being now in a series circuit. Energization of X—5 controls the emission of impulses for the proper multiplying computation from emitter 124 and the energization of CSu directs the entries into the proper columnar orders of the RH and LH accumulators.

It has been previously explained that when the multi-contacts of the CSu relay close, that an extra contact pair CSu—3 is also closed. This closure of the CSu—3 contact pair which takes place as an incident to the flow of current to the multiplying relay control magnet X, causes the energization of the Yu relay, which relay was not previously energized, its related brush not standing on a related zero spot. Energization of Yu then shifts the relay points Yu—1 and Yu—2 so that upon a succeeding multiplication by the next significant figure current flowing in through N—1 will be diverted by the Yu—2 contacts over to the Yt—2 set of contacts which are in reverse position from that shown, thence over to the Yh—2 contacts (which are in the position shown) since they have not been shifted by energization of Yh by a brush of the readout in the hundreds order standing on the zero spot. The next multiplying current impulse then flows through N—1, through Yh—2, through CSh, over through the brush of the readout to the particular wire of the 199 group, say the seventh wire and down through the X—7 magnet and out to ground upon closure of cam contacts CC—1 (Fig. 13b). Again there will be a concurrent energization of the X—7 magnet and the CSh column shift magnet and the energization of CSh will direct the proper entry of the impulses into the LH and RH accumulators at a shifted over columnar position therein.

The manner of controlling the emission of differentially timed product representing impulses need not be traced in detail. It is sufficient to state that the energization of the X magnets of the multiplying relays establishes their related contacts as shown on Fig. 13b and at the proper time in the operation of the machine, current impulses flow out from the emitter 124, through the multiplying relay control contacts and over to the lines generally designated 201LH and 202RH to the L and H sections of the multiplicand readout designated MCRO. The multiplicand readout allows impulses selected according to the amount of the multiplicand to flow out to the LH component lines generally designated 203LH and the RH component lines generally designated 203RH (see Fig. 13c). The lines 203LH and 203RH extend down to the contact points of the CS relays and the other points of these relays connect to the LH lines 204LH and to the RH lines 204RH which latter lines extend down directly to the magnets of the RH accumulator which are designated 192RH. The 204LH lines extend down directly to the magnets 192LH of the LH accumulator (see Fig. 13d).

By the foregoing operations the LH and RH components of partial products are entered into the LH and RH accumulators and as successive multiplying cycles ensue for successive columnar orders of the multiplier in which significant figures appear, there is a selected energization of the CS magnets to direct the impulses into the proper columnar orders of these accumulators.

Contacts CC—2 (Fig. 13a) close once per counter cycle and such closure occurs after the multiplying computation performed in each cycle is completed. Such contacts are, however, ineffective until the complete multiplication is performed. After the complete multiplying computation has been performed and at the time such contacts close, all of the Y—2 set of contacts will have been shifted to reverse position from that shown so that there is a circuit path from the 188 side of the AC line through N—I, through all of the Y—2 set of contacts, through CC—2 now closed, through multi-contact relay control magnet 2—CR and back to ground.

After the multiplying computation is complete for the multiplication of $B \times C$, the amount standing in the RH accumulator is transferred over into the LH accumulator. This is brought about by the energization of magnet 2—CR previously referred to, which magnet when energized and at the proper time in the cycle of operation in the machine, allows contacts 2—CR 1 to 16 (Fig. 13c) to shift to reverse position from that shown and which also allows contacts 2—CR—17 (Fig. 13c) to close and to also open contacts 2—CR—18 (Fig. 13a) previously referred to as being initially closed, and now shifted to open position. Subsequently upon the operation of emitter 125, impulses are emitted to the RHRO readout device and through the shifted 2—CR 1 to 16 contacts to the lines 204LH which extend to the LH accumulator magnets 192LH. At the completion of an emission of impulses by the 125 emitter, the reset magnets 195RH, 195MC, 195MP and a relay magnet M are energized. The 195 magnets are the reset magnets of the corresponding entry receiving devices. Such entry receiving devices are accordingly reset in the usual manner (see Fig. 1). The opening up of contacts 2—CR—18 (Fig. 13a) brings about a de-energization of relay coil N and causes a corresponding de-energization of the various Y magnets of the cycle controller. The complete product of the $B \times C$ part of the computation is now standing in the LH accumulator.

By this time in the operation of the machine the product of $B \times C$ will be in the LH accumulator and the entry of the component A direct from the record will be in the NG accumulator, such latter entry remaining there during the various computing cycles. The machine is now ready to subtract the product of $B \times C$ from the amount of the component A standing in the NG accumulator. This is effected in the following manner. The energization of relay coil M by emitter 125 encountering the extra spot in the manner previously explained, will have caused a momentary closure of relay points M—1 (Fig. 13f). Such momentary closure of contacts causes an energization of relay coil G and causes relay points G—1 to become closed. A stick circuit for relay coil G is established through points G—1, through relay points O—1 normally closed to the other side of the D. C. line.

Referring now to Fig. 13e, the energization of relay coil G causes relay points G—2 to close. Current flows from the A. C. line 188, through G—2, through cam contacts CC—3 which close at the proper time in the cycle, through a switch 207 which is placed in the minus position for subtracting operations, to the multi-contact relay magnet 3—CR, through the magnet of multi-contact relay 1—CR and back to ground. The magnets 3—CR and 1—CR are the control magnets of the multi-contact plate relays of the general type shown in Figs. 4 and 5. Energization of 3—CR causes subsequent closure of multi-contacts 3—CR 1—17 and energization of 1—CR causes subsequent opening of contacts 1—CR 1—10 previously referred to. One side of contacts 3—CR 1—16 is individually wired to a set of lines 209, which extend to one side of a plug board 210. The other side of this plug board 210 is wired to the 192NG magnets at a point beyond the 1—CR 1—10 contacts previously referred to. The subtracting of the product from the amount standing on the NG accumulator is effected by emitting impulses to the top section of the LH readout which top section is a readout of the inverting type and designated IVLRO on the circuit diagram (Fig. 13d). Such emission of complemental impulses through this readout is effected in the following manner. Following the energization of the 3—CR magnet, contact 3—CR—17 closes providing current supply for emitters 126 and 127, which latter emitter 127 is an emitter of the complemental type. This emitter 127 emits these impulses through the IVLRO readout device, through the 3—CR 1—16 multi-contacts to the lines 209, through plug connections at plug board 210, to the 192NG accumulator magnets. In this manner with the complemental addition of the product amount to the amount standing on the NG accumulator, the net result of the computation $A-(B \times C)$ is set up on the net-gross accumulator NG.

The foregoing description has explained the manner in which an amount is set up on the net-gross accumulator NG for an $A-(B \times C)$ computation. In the event that the amount of the product of $B \times C$ is to be added to the amount A, the switch 207 would be thrown to the plus position and with the switch in this position in lieu of magnet 3—CR being energized, a plate relay control magnet 4—CR would be energized concurrently with the energization of 1—CR. The energization of 4—CR will close the multi-contact points designated 4—CR 1—17 on the circuit diagram (Figs. 13e and 13d). Contacts 4—CR—17 will establish a circuit to the 126 emitter and to the 127 emitter (for the purpose of energizing relay coils T and O as will be hereinafter explained) and upon the operation of the 126 emitter, impulses will be directed through one of the lower sections of the LHRO readout device designated LHRO on the circuit diagram and through a cable 213, and transverse wires 215, through the multi-contacts 4—CR 1—16 now closed to the set of lines 209 and thence through the paths previously traced to the 192NG accumulator magnets. In this way the product amounts of $B \times C$ would be added to the amount of the component A standing on the NG accumulator.

If the machine is to take a summary of the various $B \times C$ computations concurrently with the subtracting of $B \times C$ from A or the adding of $B \times C$ to A, the machine enters the amount of $B \times C$ into the summary products accumulator SP—1. The accumulator magnets of this SP—1 accumulator are designated 192SP—1 on the circuit diagram (Fig. 13e) and such countermagnets through a plug board 214 connect to the lines 215 which enter cable 213 and extend to the contacts 4—CR 1—16. With the operation of emitter 126, the amount standing on LHRO which is the product of $B \times C$, would be entered into SP—1. This entry of a product from LHRO would be made into the SP—1 accumulator irrespective of whether or not the complement or the true number was being entered into the NG accumulator provided proper plug connections are used at plug board 214. If a complementary amount is being entered into NG, multi-contacts 3—CR 1—16 are closed and contacts 4—CR 1—16 are open. If an additive amount is to be entered into the NG accumulator contacts 3—CR 1—16 are open and 4—CR 1—16 are closed and accordingly upon adding with an emission of impulses from the 126 emitter the same amount would be entered into the NG as would be entered in SP—I.

In further explanation, it may be stated that with 126 emitter supplying impulses and with contacts 4—CR 1—16 closed that current supply would be concurrently provided to emitter 127 and emitter 126 and it is this concurrent supply of current to both emitters 127 and 126 that permits of adding an amount from the LHRO readout into SP—I accumulator when a complemental amount is being entered in the NG accumulator. In other words irrespective of there being an additive entry into NG or a subtracting entry by complemental addition, emitter 126 will supply impulses for adding in SP—I.

It has been explained before that it is not only desirable to summarize the intermediate results of the $B \times C$ computation, but it is also desirable to summarize and obtain a summary of final results. This is effected in the following manner. At the completion of the computation from each detail card, the net amount of the $A \pm (B \times C)$ computation will be standing in the NG accumulator. Upon the brush of emitter 127 encountering an extra spot, relay coils O and T become energized (see Fig. 13d). The energization of relay coil O opens relay points O—I (Fig. 13f) and opens the stick circuit for relay coil G. Relay coil G becomes de-energized causing relay points G—2 (Fig. 2e) to open. The opening of this circuit at this point prevents a further transfer of the $B \times C$ product to the NG accumulator or to the SP—I accumulator. The energization of relay coil T will cause the momentary closure of relay points T—I and cause the energization of relay coil H. Upon energization of H, points H—I are closed and a stick circuit for relay coil H is established through relay points Z—I which are normally closed. The energization of relay coil H (Fig. 13f) causes closure of relay points H—2 (Fig. 13e) and upon closure of cam contacts CC—4 current supply is afforded to emitter 128. The emitter 128 then functions in the usual way and emits impulses through one section of the NGRO readout device, which impulses flow via wires 216 to plug board 217 and thence via the plug connections of this plug board to the 192SP—2 countermagnets which are the countermagnets of the SP—2 accumulator. In this way the final result of the computation is entered into the second summary accumulator.

The emitter 128 upon encountering the extra spot causes energization of relay coils L, Z and J. Energization of relay coil Z (see Fig. 13f) opens points Z—I to break the stick circuit for relay coil H and prevent a second unwanted transfer over of amounts into the SP—2 accumulator. The energization of relay coil L will cause relay points L—I (Fig. 13f) to momentarily energize the punch clutch magnet 190 (see also Fig. 1a) and call the punching section of the machine into operation.

The machine is now ready to punch the several amounts. Provision is made for punching the intermediate result or product of $B \times C$. Provision is also made for punching the net amount or final result of $A \pm (B \times C)$. Upon the energization of relay coil J by emitter 128 (Fig. 13e) in the manner previously explained relay points J—I (Fig. 13f) become closed causing energization of relay coil K. A stick circuit is established for relay coil K, through points K—I and normally closed points F—I. Energization of relay coil K (see Figs. 13f and 13e) causes closure of relay points K—2 and upon closure of cam contacts CC—5 multi-contact control relays 5—CR and 6—CR are energized. The energization of 5—CR and 6—CR brings about subsequent closure of the related multi-contact points 5—CR I to 17 (Fig. 13d) and points 6—CR I to 11 (Fig. 13e). The closure of points 5—CR—17 and 6—CR—11 provides current supply for emitters 120 and 121. Such emitters then emit impulses through the other sections of the LHRO readout and the NGRO readout device. The impulses flowing through the section of the LHRO readout flow through cable 218 to a plug board 219 and via the plug connections at this plug board to certain selected ones of the punch selector magnets 113. The impulses which are emitted through the other section of the NGRO readout from emitter 121 flow through a cable 220 to another section of the plug board 219 and thence to other of the punch selector magnets 113. The punch then functions in the manner previously explained and causes punching of the intermediate result and the final result upon the record from which the component factors entering into the computation were derived. Upon emitter 121 encountering an extra spot, a circuit is established to energize relay coil F and reset magnet 195NG. The energization of relay coil F opens points F—I (Fig. 13f) and causes de-energization of relay coil K to prevent a further readout to the punch magnets of the machine. The energization of reset magnet 195NG brings about a reset of the NG accumulator.

The machine has now completed its computation on the detail record card and punched the results of the computation upon that card and it is ready to feed a new card for a succeeding computation. Towards the end of the cycle of operation of the punch cam contacts PC—3 (Fig. 13f) close. Such contacts cause an energization of the main card feed clutch magnet 169, the circuit being completed to this feed clutch magnet through relay points A—2 which are closed at this time. A new card feed now ensues and the previously punched card is ejected from the punch and discharged into the discharge magazine. The new card is read in the machine in the manner previously explained and a new computation is carried out.

It may be here explained that if summary products are not to be punched, but are only to be accumulated, the summary product accumulators may be reset at the end of a run of detail cards by a hand initiated operation. Such hand reset of the summary product accumulators is effected by a special reset key 221 which energizes reset magnets 195SP—I and 195SP—2. Energization of these reset magnets causes reset of the accumulators SP—I and SP—2 in the usual way. When summary card control is desired, the hand initiated reset is not employed, but such reset is initiated automatically, as will be subsequently explained.

In the event that summary amounts are to be punched, special summary cards are used. Such summary cards are interspersed between groups of the detail cards and each summary card bears a special designating characteristic in the form of an X punching in one of the extra index point positions.

Upon summary card operations the detail cards pass through the machine in the usual way and the computations and punching operations proceed as before. Upon a special summary card passing through the machine, the perforated extra index point encounters the advance sensing brush 86 and this establishes a control circuit for summary punching operations.

Referring to Fig. 13e on summary punching operations, switch 222 will have been previously closed. The summary card will be positioned in the card feeding and sensing section of the machine with the extra 86 brush standing over the special perforation in the summary card. Toward the close of the cycle of operation of the punching section of the machine, cam contacts PC—1 will close. A circuit will accordingly be established from the 188 side of the A. C. line, through relay points A—3 now closed, through the extra 86 brush and its cooperating contact block 88 to a relay coil R. Energization of relay coil R will momentarily close relay points R—1 (see Fig. 13f) and cause energization of relay coil W. A stick circuit for relay coil W is established through relay points W—1 and cam contacts PC—2 which are now closed. The energization of relay coil W will open relay points W—4 (Fig. 13a) and prevent any supply of current to the conductor roll 77 and thus prevent any readings being taken from the summary card by brushes 84 in the event that such summary card contains other pre-punched data in its fields. The energization of relay coil W will also open up relay points W—2 (Fig. 13a) to prevent any set up of the cycle controller and to prevent unwanted useless multiplying cycles while the summary card is being introduced into the punch and until it is punched therein. The summary card upon entering the punching die will have closed punch card lever contacts 91 (Fig. 13f) and energized relay D and the energization of relay D will have initiated a reset of the LH accumulator in the manner previously explained. Such reset occurs when cam contacts FC—3 close (see Fig. 13a). The energization of relay coil W in the manner previously explained will have closed relay points W—3 (see Fig. 13e). Reset of the LH accumulator will have closed contacts 167 and accordingly a circuit is established to a relay coil S and to controlling multi-contact relay magnets 7—CR and 8—CR. The energization of magnet 7—CR will bring about subsequent closure of multi-contact relay points 7—CR 1 to 10 and 7—CR 11 (Fig. 13e). The energization of 8—CR will bring about subsequent closure of multi-contacts 8—CR 1 to 10 (Fig. 13f) and 8—CR—11 (Fig. 13e). The energization of relay coil S will momentarily close relay points S—1 (Fig. 13f) to momentarily energize the punch clutch magnet 190 and call the punching section of the machine into operation.

Referring again to Fig. 13e with contacts 7—CR—11 closed and 7—CR 1 to 10 closed, current is supplied to the emitter 122 and impulses are emitted through the SPRO—1 readout through the 7—CR 1 to 10 contacts, to the wires in the cable 224 which lead to the plug board 219 and thence to selected ones of the punch selector magnets 113. In this way the summary of intermediate results of B×C is transferred over to the punching recording section of the machine for subsequent punching. Similarly closure of 8—CR—11 (Fig. 13e) supplies current to emitter 123 and the emitter emits impulses through the SPRO—2 readout through the 8—CR 1 to 10 contacts to a cable 225 which also leads to the plug board 219 and to selected punch selector magnets 113. The punch now functions as before and punches out the summary of the intermediate results and of the final results upon the summary card.

It will be understood that suppression of any desired punching in the operation of the machine can be effected by removal of the proper plug connections. Accordingly, the machine can punch the intermediate and final results or either of them or neither of them upon the detail cards and it can also punch the summary of the intermediate and of the final results or either of them or neither of them upon the summary card.

Upon the brush of emitter 123 encountering the extra spot, a relay coil 226 becomes energized, which effects closure of relay points 226a (Fig. 13f). The closure of the relay points 226a causes energization of relay coil V when relay points A—4 are closed. The energization of V closes relay points V—1 to establish a stick circuit for V through the reset contacts 168 of the SP—1 accumulator, which are normally closed. Energization of relay coil V also closes relay points V—2 (Fig. 13a).

After the summary card has been punched a new card feed of a following detail card of the following group occurs (if such following detail card is present). This new card feed is initiated upon closure of cam contacts PC—3 which cause energization of the feed clutch magnet 169 through relay points A—2 now closed. Near the end of the card feed cycle, cam contacts FC—3 close and upon the closure of such contacts and with relay points V—2 closed, reset magnets 195SP—2 and 195SP—1 become energized and reset is effected by the two summary products accumulators automatically by the operation of the machine. Reset of the SP—1 accumulator temporarily opens contacts 168 to break the stick circuit to relay coil V to de-energize it and to prepare the relay coil V for the next summary card control.

If there are no detail cards following the summary card the summary counters must be reset by hand which is effected by closure of the hand reset key 221 (Fig. 13a).

When cards are exhausted from the machine the card lever contacts 89 and 90 will have become opened and will automatically terminate further machine operations.

When the machine operation terminates, the last card may be carried out of the punching section of the machine by the depression of an auxiliary start key 189b.

Referring to Fig. 13f it will be noted that the punch selector magnets 113 extend to double plug sockets on the plug board 219. With this double plug board construction by proper plugging it is possible to punch the summary cards with their summary products in the same fields in which the detail cards receive their punched amounts.

One feature of the present invention resides in the provision of means enabling a readout to be taken of an amount standing upon an accumulator and which provides for the concurrent entry of this amount and the complement of this amount into two other accumulators. This is effected when an amount of $B \times C$ is read out from the LH accumulator and entered into the SP—1 accumulator and when the complement of this amount is being concurrently entered into the other accumulator NG.

Referring to Figs. 14a to 14c inclusive, which show the timing diagram of the machine, this diagram requires no detailed description on account of the legend and numerals thereon which are self-explanatory. It may be stated that the first two cycles shown on Fig. 14a are supplemental card feed cycles required only upon starting up the machine. With the machine in operation and running upon a continuous sequence of detail cards only, the cycle of operation of the machine would commence with the cycle marked 3 and finish with the cycle marked 10 (Fig. 14b) and begin operations again upon cycle 3 (Fig. 14a). Cycle No. 5 may be indefinitely increased to a plurality of further No. 5 cycles depending upon the number of significant figures in the multiplier factor or component C. As shown, only one multiplying cycle is delineated.

When a summary card follows a group of detail cards with a further sequence of detail cards after a summary card, the cyclic operation is somewhat modified. After cycle 8 the machine proceeds upon cycle 9ds (Fig. 14c) then with 10ds which cycles are those in which the last detail card is punched and the punch parts restored. Thereafter cycles occur for the feeding of the summary card (cycle 3s). In this 3s cycle it will be noted that there are no factors read from the card and in this way the 3s cycle differentiates from cycle 3 with which in many other respects it generally conforms. Following cycle 3s the 4s cycle occurs corresponding generally to cycle 4. It is during the 9s and 10s cycles that the summary card is punched. Following cycle 10s the machine resumes operation upon cycle 3 (Fig. 14a) for the next group of detail cards and continues as before described. It is noted that upon cycle 4 following a summary card punching operation an extra operation occurs, viz the automatic reset of the SP—1 and SP—2 accumulators. This operation would not occur on a run with detail cards only without summary punching because reset would be manually initiated at the end of the run.

It is to be further noted that upon summary card operations that the cycle controller is not set up upon cycle 4s. This is shown by the fact that the circuit through the LH reset contacts 166 is not completed on cycle 4s, whereas such circuit is completed on cycle 4. This control eliminates cycle 5 through 8 upon summary card operations and materially saves the time of operation of the machine. In previous machines with supplemental cards in a run the cycle controller caused idle but time consuming machine cycles when a supplemental card was encountered.

Various forms of relay devices are used in the present machine. Heretofore in the specification and hereinafter in the claims the term "relay" will be understood to refer to the electromagnetically controlled electromechanical multi-contact relays of the general type shown on Figs. 4 and 5. Other relays used in the machine are of the purely electrical type such as those used in the cycle controller with relay coils Y and contacts Y—1 and Y—2.

What I claim is:

1. A record controlled accounting machine with means for passing records therethrough, said records including detail records and summary records, summarizing means receiving entries under the control of the detail records, recording means controlled by said summarizing means, and means under the control of a summary record for calling the recording means into operation to record a summary from the summarizing means and to record the same upon the summary records.

2. A record controlled accounting machine with means for passing records in a common run therethrough including groups of data containing records and intervening records which have a distinctive characteristic, means for receiving and accumulating data from the data containing records, recording means controlled through intervening means by said last mentioned means for recording summaries set up in the receiving means upon said records with the distinctive characteristic, and means called into action by the record with a distinctive characteristic and under the control of such distinctive characteristics of such record for calling the recording means into operation to record upon the record which initiated the recording of the summarized data related to the data upon the data containing records in the common run.

3. A multiplying machine including means for passing detail and supplemental cards through the machine, manifesting means controlled for manifesting factor data derived from each detail card, multiplying means controlled thereby, a cycle controller for said multiplying means for controlling the cycles of operation thereof, and means called into action by a supplemental card for preventing the cycle controller from causing idle machine cycles upon supplemental cards being reached in a run of detail cards.

4. An accounting machine for effecting computations in which one entered component A is algebraically added to an intermediate product of two entered other components B and C and wherein results obtained by the operation of the machine are recorded, comprising entry receiving means for the different components, multiplying means for multiplying the two components B and C controlled from the two entry receiving means receiving such components, means for transferring the product obtained by the multiplying means to the entry receiving means receiving the component A, said transfer means including means to cause algebraic addition therein and to thereby set up in such receiving means a final result, result recording means, said machine including product receiving means controlled by the multiplying means for retaining the intermediate product created by the multiplying means for subsequent recording, and means for controlling the recording means by said last mentioned means and by the entry receiving means receiving the final result so that the intermediate result which becomes algebraically added into the final result may be recorded and so that the final result may also be recorded.

5. A record controlled accounting machine with record controlled entry receiving means for three components A, B and C, which components are derived from each record, multiplying means controlled by the B and C entry receiving means for multiplying components B and C and including means for setting up the product thereof, means controlled by the last mentioned means for transferring the product obtained by the multiplying means to the entry receiving means receiving the component A, said transfer means including means to cause algebraic addition therein so that a final result is set up in such receiving means, recording means operable after multiplying and algebraic adding operations have been performed, means including control means for controlling reset of the product set up means to cause the retention of the product set up upon the product setup means until the recording means is operated and means for controlling the recording means by said product setup means and by the receiving means upon which the final result is set up to record the intermediate result which comprises the product of $B \times C$ and the final result which includes the component A and the product of $B \times C$.

6. An accounting machine comprising three accumulators, means for controlling the operation of certain of the accumulators, including means for concurrently transferring a true number amount standing upon one accumulator to another of said accumulators and means for concurrently with the foregoing operation transferring to the third accumulator a complemental amount corresponding to the true number amount standing upon the first mentioned accumulator, said last two mentioned transfer means comprising independent control means commonly positioned by the first mentioned accumulator according to the amount standing thereon.

7. An accounting machine comprising three accumulators, a multiple type of readout means positioned and set up from one accumulator, means for controlling the operation of the other accumulators, including means for utilizing certain elements of one of the aforesaid readout means for controlling the transfer to a second accumulator of the true number standing upon the accumulator provided with the readout and means for utilizing other elements of the other readout to control the concurrent transfer to the third accumulator while transfer is being concurrently effected into the second accumulator of the complement of the true number standing upon the accumulator with which the readout is associated.

8. An accounting machine for effecting multiplying operations and for bringing the computed product together with another entered component, comprising entry receiving means for retaining and digitally setting up the various factors and the component, said component receiving means being of the accumulative type receiving entries in different orders thereof, means for concurrently entering the factors and the component into their respective receiving means, multiplying means controlled from the set up factor entry receiving means, said multiplying means including product setup means, means controlled by said product setup means for transferring the computed product to the entry receiving means receiving the other component to accumulate and set up therein a result composed of the product and such component, said transfer being effected by entries concurrently directed into different orders of the receiving means, a recording means and means for controlling such recording means from the means upon which the final result is set up.

9. A record controlled accounting machine with record controlled amount manifesting means for three components A, B, and C, which components are derived from each record, means controlled from the amount manifesting means for B and C for multiplying components B and C, means for setting up the product thereof, means cooperating with the product set up means for causing the algebraic adding of said set up product to the other component A which was derived and entered from the record in the amount manifesting means for the A component and upon which the algebraically added result is set up and from which a final result may be derived and means controlled from the means upon which the product of $B \times C$ is set up for recording upon the record from which the components were derived the product of $B \times C$ which comprises an intermediate result.

10. A record controlled accounting machine with record controlled entry receiving means for three components A, B, and C, which components are derived from each record, means for multiplying components B and C controlled by the entry receiving means therefor, including means for receiving and setting up the product thereof, means for interconnecting the product set up means and the entry receiving means for the A component and means for causing the algebraic adding of said set up product to the other component A in said receiving means, means upon which the result is set up, and means controlled by the product set up means and by the means upon which the result is set up for recording upon the record from which the components were derived the product of $B \times C$ and the result of the product of $B \times C$ algebraically added to the component A.

11. In a record controlled and record making accounting machine with record controlled entry receiving means for separately receiving each of three terms A, B, and C, which are derived from a common record, multiplying devices controlled by two of the receiving means for multiplying two terms B and C and obtaining a product, product receiving means for receiving such intermediate product result, reset means for the product receiving means, means controlled by the product receiving means for causing the algebraic addition of such product with the third term A in the third entry receiving means, recording means for recording result data upon the record from which the terms were derived including in combination, means to provide for the recording of the intermediate product result by the recording means under the control of the product receiving means, said means including devices for controlling the reset means for the product receiving means to prevent the resetting of the product receiving means until after such product is algebraically added to the third A term and until the recording of such intermediate product.

12. An accounting machine with means for handling a series of groups of detail records which are interspersed by summary cards with a special characteristic designation thereon, record controlled entry receiving means, means controlled thereby for multiplying factor data entered from detail cards, and including products receiving means, means controlled by the products receiving means for summarizing the products obtained from the several detail cards of a group, recording means, and means called into action upon the passage of a summary card through the machine and automatically under its control for causing the recording means to record upon the summary card the summary of products of the preceding group of detail cards which are summarized by the aforesaid summarizing means, the said recording means being controlled by means associated with the summarizing means.

13. A record controlled accounting machine including means for passing a series of records through the machine, said records including summary cards with distinctive characteristics which are interspersed between detail cards, record controlled entry receiving means for three component factors A, B and C, which component factors are derived from each detail record, means for sensing the summary cards and setting up a control thereby, means controlled by the receiving means for B and C factors for multiplying such components, including product receiving means upon which the product is set up, means for interconnecting the product receiving means with the receiving means for the A component so that one controls the entry into the other, means inter-acting with said last mentioned means for causing the algebraic adding of said product to said A component in one of the aforesaid connected receiving means which receiving means includes means upon which said algebraic sum is set up as a final result, means under the control of the product receiving means for summarizing the computed products and for setting up the sum thereof, means under the control of the set up means for final results for summarizing such final results and for setting up the sum of such final results, recording means controlled by the product set up means and the final result set up means for recording products and final results on detail cards and controlled by the setting up means for sums of products and sum of final results for recording such sums upon summary cards, and means for calling the recording means into operation to record summarized final results and summarized products upon the summary cards, said last mentioned means being under the control of the control set up by the summary card sensing means.

14. An accounting machine for effecting computations in which one entered component A is algebraically added to an intermediate product of two entered other components B and C, and wherein results obtained by the operation of the machine including product results are recorded, comprising entry receiving means for the three components, multiplying means for multiplying the two components B and C controlled by the two entry receiving means receiving such components, and set up upon the product set up means, means for transferring the product obtained by the multiplying means and upon the product set up means to the entry receiving means receiving the A component to thereupon set up therein a final result which may be derived therefrom, result recording means, said machine including means controlling the product set up means for retaining the product therein for subsequent recording and means for causing such subsequent recording, said product set up means controlling the recording means upon recording operations whereby the intermediate product result which is included in the final result may also be recorded by the recording means.

15. A record controlled accounting machine including record controlled entry receiving means for three components A, B and C, which components are derived from each record, multiplying means for multiplying components B and C controlled by the entry receiving means therefor and including means for receiving and setting up the product thereof as an intermediate result, means for interconnecting the product receiving and set up means with the receiving means for the A component, means inter-acting with the foregoing means for causing the algebraic addition of the product to the A component in one of the interconnected receiving means to set up therein a final result which may be derived therefrom, recording means operable after multiplying and algebraic adding operations have been performed, means for controlling the product set up means for retaining the product set up thereon until the recording means is operated, and means for controlling the recording means from said product set up means to record the intermediate result which comprises the product of B and C.

16. An accounting machine with means for handling a series of groups of detail records which are interspersed with special summary records with a special characteristic designation thereon, including in combination means for deriving factor data and data pertaining to another term from each detail record, means controlled thereby for manifesting such data, means controlled by the factor data manifesting means for multiplying said factor data, said multiplying means including a product receiving means upon which each successive product is set up as an intermediate result, means for interconnecting said product receiving means with the receiving means for the other term, means inter-acting with said last mentioned means for causing the algebraic addition of the intermediate product result and the other term in one of the aforesaid last mentioned receiving means to provide a final result, means upon which such final result is set up, means controlled by the product receiving means upon which the intermediate results are set up for summarizing intermediate results pertaining to a plurality of detail records and for setting up a sum of such intermediate results, means controlled by the means upon which the previously retained final result is set up for summarizing final results pertaining to a plurality of detail records and for setting up a sum of such final results, recording means controlled by the means upon which the sum of final results are set up and by the means upon which the sum of intermediate results are set up, and control means called into action upon the passage of a summary card through the machine and automatically under its control by a special characteristic thereon for calling the aforesaid recording means into operation to record upon the summary cards the sum of intermediate results and the sum of final results.

17. A record controlled calculating machine including record controlled entry receiving means for receiving three terms, means under the control of two of the receiving means for multiplying two terms of the calculation and obtaining the product, receiving means for receiving a set up of such product, which comprises an intermediate result, means for interconnecting the product receiving means with the entry receiving means for the third C term, means inter-acting with said last mentioned means for causing the algebraic addition of the product and the third C term in one of the aforesaid last mentioned receiving means to obtain a final result, means upon which such final result is set up, said means being controlled by the receiving means in which the aforesaid algebraic addition is effected, recording devices controlled by the last mentioned means for recording the final result upon the record from which the terms were entered, and means controlled by the means upon which the intermediate product result is set up for also controlling the recording means to record upon the record the intermediate result which comprises the product of two terms.

18. An accounting machine including at least three electrically controlled accumulators, means including readout means positioned by one accumulator and electrical circuits from said readout to the other two accumulators, said read out comprising independent segments traversed by brushes commonly positioned by the one accumulator, and with independent circuits connecting the independent segments and the two accumulators, whereby the read out is capable of independently controlling impulses for the concurrent read out of both the complement and the true value of the amount upon the one accumulator, means for transferring amounts from said one of the accumulators to each of the other accumulators, said means including multiple control means controlling said circuits for directing a concurrent negative entry into one accumulator while a positive entry is being made concurrently into another accumulator.

19. In a multiplying machine with means for multiplying amounts derived from records and with recording means for recording results of computations upon the records from which the data derived from the calculation was derived, and with means for also algebraically adding an amount derived from the record to the product obtained by multiplication to provide a final result amount in a receiving means for controlling final result recording and including in combination with the foregoing means of a product result amount receiving means controlled by the multiplying means for controlling intermediate product result recording by the recording means, and control means for controlling such product result amount receiving means to preserve the product amount therein until recording of the intermediate result is effected along with the recording of the final result by the recording means whereby both intermediate and final results may be recorded by the recording means upon the record and neither intermediate nor final results be recorded one to the exclusion of the other.

20. In a multiplying machine with means for multiplying amounts derived from records, with a result receiving means for products, and with means controlled thereby for recording products of such amounts upon the records from which the amounts were derived, and including means for algebraically adding together another amount derived from the record to the product amount obtained by the multiplying calculation, and also including recording means for recording the final result upon the record from which the factor data was derived, and including in combination, means associated with the foregoing recording means for also recording upon the record from which the terms of the calculation were derived, the intermediate product result along with the final result, said means including an intermediate result receiving means controlled by the multiplying means and control means therefor to cause the retention of such intermediate result therein until such intermediate result which comprises the product is recorded by the recording means therefor, means to concurrently initiate intermediate and final result recording, and control means for said initiating means controlled by the means which brings about algebraic adding upon completion of such adding.

21. A multiplying machine including means for passing detail and supplemental cards through the machine, factor manifesting means receiving factor data from detail cards, multiplying means controlled thereby, means tending to cause a dummy multiplying operation of said multiplying means when a supplemental card is reached in a run of detail cards and means called into action by said supplemental card for preventing the aforesaid means from causing such idle machine cycle upon supplemental cards being reached in a run of detail cards.

22. The invention set forth in claim 10 wherein selective means is provided to suppress or cause recording of $B \times C$.

23. A multiplying machine including means for passing detail and supplemental cards through the machine, factor manifesting means receiving factor data from detail cards, multiplying means controlled thereby, card controlled means which may tend to cause dummy multiplying operations of said multiplying means when a supplemental card is reached in a run of detail cards, and means called into action by said supplemental card for preventing the aforesaid means from causing idle machine cycles upon supplemental cards being reached in a run of detail cards.

JAMES W. BRYCE.

CERTIFICATE OF CORRECTION.

Patent No. 2,106,477.  January 25, 1938.

JAMES W. BRYCE.

It is hereby certified that error appears in the printed specification of the above numbered patent requiring correction as follows: Page 13, first column, line 39, claim 14, strike out the words and comma "and set up upon the product set up means,"; and line 41, same claim, before "upon" insert the words set up; and that the said Letters Patent should be read with these corrections therein that the same may conform to the record of the case in the Patent Office.

Signed and sealed this 1st day of March, A. D. 1938.

(Seal)

Henry Van Arsdale,
Acting Commissioner of Patents.